(12) United States Patent
Chang

(10) Patent No.: US 11,490,367 B2
(45) Date of Patent: *Nov. 1, 2022

(54) COMMUNICATION METHOD, NETWORK DEVICE, USER EQUIPMENT, AND COMMUNICATIONS SYSTEM

(71) Applicant: Huawei Technologies Co., Ltd., Shenzhen (CN)

(72) Inventor: Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

This patent is subject to a terminal disclaimer.

(21) Appl. No.: 16/668,989

(22) Filed: Oct. 30, 2019

(65) Prior Publication Data

US 2020/0068536 A1 Feb. 27, 2020

Related U.S. Application Data

(63) Continuation of application No. 15/662,954, filed on Jul. 28, 2017, now Pat. No. 10,499,374, which is a
(Continued)

(51) Int. Cl.
*H04W 72/04* (2009.01)
*H04M 3/42* (2006.01)
(Continued)

(52) U.S. Cl.
CPC ............ *H04W 72/04* (2013.01); *H04L 5/001* (2013.01); *H04L 5/0053* (2013.01);
(Continued)

(58) Field of Classification Search
CPC ........... H04W 12/041; H04W 36/0069; H04W 74/0833; H04W 76/15; H04W 76/27;
(Continued)

(56) References Cited

U.S. PATENT DOCUMENTS

2012/0257513 A1 10/2012 Yamada
2013/0242851 A1* 9/2013 Dinan ................. H04W 52/146
370/312
(Continued)

FOREIGN PATENT DOCUMENTS

CN 103139911 A 6/2013
CN 103888987 A 6/2014
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3rd Generation Partnership Project, 3GPP TS 36.321, V 12.4.0, Dec. 2014.
(Continued)

*Primary Examiner* — Awet Haile
(74) *Attorney, Agent, or Firm* — Conley Rose, P.C.

(57) ABSTRACT

The present disclosure discloses a communication method, a network device, user equipment, and a communications system. The communication method includes determining, by a network device, to allocate a first secondary cell group (SCG) to user equipment, and sending, by the network device, first configuration indication information to the user equipment, where the first configuration indication information indicates at least one type of the following configuration transmitting uplink control information related to a cell in the first SCG by using a physical uplink control channel (PUCCH) of a first cell, where the first cell belongs to a second SCG of the user equipment, or processing data transmission on at least one cell in the first SCG by using a layer 2 functional entity located in the second SCG. The communication method disclosed in the present disclosure can reduce complexity of UE.

20 Claims, 11 Drawing Sheets

Related U.S. Application Data continuation of application No. PCT/CN2015/072017, filed on Jan. 30, 2015.

(51) Int. Cl.
*H04W 48/16* (2009.01)
*H04W 48/18* (2009.01)
*H04W 84/12* (2009.01)
*H04W 88/10* (2009.01)
*H04W 56/00* (2009.01)
*H04L 5/00* (2006.01)

(52) U.S. Cl.
CPC ....... *H04M 3/42289* (2013.01); *H04W 48/16* (2013.01); *H04W 48/18* (2013.01); *H04W 56/00* (2013.01); *H04W 84/12* (2013.01); *H04W 88/10* (2013.01); *H04L 5/0098* (2013.01); *H04M 2207/18* (2013.01); *H04W 72/0413* (2013.01)

(58) Field of Classification Search
CPC ... H04W 12/04; H04W 12/02; H04W 12/033; H04W 12/037; H04W 12/0433; H04W 12/06; H04W 12/122; H04W 28/18; H04W 56/00; H04W 56/0015; H04W 72/0453; H04W 76/11; H04W 76/16; H04W 76/28; H04W 80/02; H04W 84/045; H04L 5/001; H04L 63/068; H04L 2463/061; H04L 2463/062; H04L 5/00; H04L 5/0032; H04L 63/062; H04L 63/10
See application file for complete search history.

(56) References Cited

U.S. PATENT DOCUMENTS

| | | | |
|---|---|---|---|
| 2013/0258958 A1* | 10/2013 | Dinan | H04W 56/0045 370/329 |
| 2013/0336298 A1 | 12/2013 | Dinan | |
| 2014/0092865 A1 | 4/2014 | Heo et al. | |
| 2014/0269575 A1 | 9/2014 | Zhang et al. | |
| 2015/0208235 A1* | 7/2015 | Ingale | H04W 12/041 455/411 |
| 2015/0264562 A1* | 9/2015 | Wu | H04W 12/04 380/270 |
| 2015/0319801 A1* | 11/2015 | Lee | H04W 74/0833 370/329 |
| 2015/0327230 A1 | 11/2015 | Takeda et al. | |
| 2016/0029213 A1* | 1/2016 | Rajadurai | H04W 12/033 380/283 |
| 2016/0037526 A1 | 2/2016 | Kim et al. | |
| 2016/0205681 A1 | 7/2016 | Kim et al. | |
| 2016/0249210 A1 | 8/2016 | Chang et al. | |
| 2016/0366175 A1* | 12/2016 | Basu Mallick | H04W 76/15 |
| 2017/0041865 A1 | 2/2017 | Takeda et al. | |
| 2017/0086110 A1 | 3/2017 | Wu et al. | |
| 2017/0150405 A1* | 5/2017 | Chiba | H04W 12/041 |
| 2017/0223662 A1 | 8/2017 | Xu et al. | |
| 2017/0231019 A1 | 8/2017 | Xu et al. | |
| 2018/0014332 A1* | 1/2018 | Lee | H04W 74/0833 |

FOREIGN PATENT DOCUMENTS

| | | |
|---|---|---|
| CN | 103959829 A | 7/2014 |
| CN | 104168655 A | 11/2014 |
| EP | 2849357 A1 | 3/2015 |
| EP | 2975899 A1 | 1/2016 |
| JP | 2014120941 A | 6/2014 |
| WO | 2013168917 A1 | 11/2013 |
| WO | 201412077 A1 | 8/2014 |
| WO | 2014120077 A1 | 8/2014 |
| WO | 2014141965 A1 | 9/2014 |
| WO | 2014163349 A1 | 10/2014 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3rd Generation Partnership Project, 3GPP TS 36.331, V 12.4.1, Dec. 2012.
"3rd Generation Partnership Project; Technical Specification Group Radio Access Network; Study on Small Cell enhancements for E-UTRA and E-UTRAN; Higher layer aspects (Release 12)," 3GPP TR 36.842, V 12.0.0, Dec. 2013, pp. 1-71.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V 12.4.0, Dec. 2014, pp. 1-251.
"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331, V 12.4.0, Dec. 2014, pp. 1410.
MediaTek Inc., "Mac Entity Modeling," 3GPP TSG-RAN2 #87bis Meeting, R2-144253, Shanghai, China, Oct. 6-10, 2014, 3 pp.
"LTE Advanced-PUCCH/ShareTechnote," Jan. 1, 2014, XP055527545, 8 pp.
Qualcomm Incorporated, "Physical layer aspects for dual connectivity," 3GPP TSG RAN WG1 #76, Czech Republic, R1-140455, Feb. 10-14, 2014, pp. 1-5.
International Search Report dated Sep. 15, 2015 in corresponding International Application PCT/CN2015/072017, filed Jan. 30, 2015.
Extended European Search Report, dated Dec. 22, 2017, in European Application No. 15879451.1, 17 pp.
Notice of Reasons for Rejection, dated Sep. 14, 2018, in Japanese Application No. 2017540590, 8 pp.
Notice of Preliminary Rejection, dated Nov. 15, 2018, in Korean Application No. 1020177024058, 12 pages.
Communication Pursuant to Article 94(3) EPC, dated Dec. 4, 2018, in European Application No. H12497WOEP, 9 pp.
Office Action, dated Jan. 28, 2019, in Chinese Application No. 201580002472.3, 10 pp.

* cited by examiner

COMMUNICATION METHOD, NETWORK DEVICE, USER EQUIPMENT, AND COMMUNICATIONS SYSTEM

CROSS-REFERENCE TO RELATED APPLICATIONS

This application is a continuation of U.S. patent application Ser. No. 15/662,954, filed on Jul. 28, 2017, which is a continuation of International Application No. PCT/CN2015/072017, filed on Jan. 30, 2015, which are incorporated by reference.

TECHNICAL FIELD

Embodiments of the present disclosure relate to the communications field, and more specifically, to a communication method, a network device, user equipment, and a communications system.

BACKGROUND

A carrier aggregation (CA) technology is mainly to aggregate multiple component carriers (CC) into one carrier with higher bandwidth, so as to support high-speed data transmission. In current Long Term Evolution (LTE) carrier aggregation, a maximum of eight carriers can be aggregated. To enable a user equipment (UE) to aggregate CC on different base stations (for example, a macro base station and a micro base station), to further obtain a higher data transmission rate, a dual connectivity (DC) technology can be introduced. A main idea of the DC technology is to aggregate carriers on different base stations connected by a non-ideal backhaul link (backhaul). In DC, two cell groups or component carrier groups (CC group) are configured for one UE. One group is a master cell group (MCG), and the other group is a secondary cell group (SCG). Specific concepts are described as follows.

A MCG is a cell group that is associated with a master base station (MeNB) and includes a primary cell (PCell) and zero or at least one secondary cell (SCell).

A SCG is a cell group that is associated with a secondary base station (SeNB) and includes a primary secondary cell (PSCell) and zero or at least one secondary cell.

A PCell is a cell that establishes a Radio Resource Control (RRC) connection to UE. The PCell is responsible for providing a security-related parameter, and a physical uplink control channel (PUCCH) resource is configured for the PCell.

A PSCell is a secondary cell that is included in a SCG and for which a PUCCH resource is configured.

A PUCCH is mainly used to transmit hybrid automatic repeat request-acknowledgement (HARQ-ACK) information, channel state information (CSI), a scheduling request (SR), and the like.

Except for the foregoing PCell and PSCell, no PUCCH resource is configured for other cells (that is, SCells) included in an MCG and an SCG.

FIG. 1 shows an example of a typical DC scenario. UE establishes a connection to both an MeNB and an SeNB, and the MeNB communicates with the SeNB by using an X2 interface. An MCG includes cells associated with the MeNB a PCell, an SCell 1, and an SCell 2. An SCG includes cells associated with the SeNB a PSCell and an SCell 3. The MCG and the SCG respectively correspond to different intermediate keys (Secondary key) and layer 2 functional entities, and PUCCH resources are respectively configured for the PCell and the PSCell. In addition, when the UE performs data transmission to the MeNB or the SeNB, the UE may establish a bearer to the MeNB or the SeNB and encrypt, by using a security configuration parameter (for example, an intermediate key) of a cell group corresponding to the bearer, data transmitted over the bearer. Alternatively, the UE may establish a split (split) bearer to the MeNB and the SeNB. In this case, a part of a data packet is transmitted by using the MCG, and the other part is transmitted by using the SCG, and data transmitted by the MCG and data transmitted by the SCG are both encrypted by using a security configuration parameter corresponding to the MCG.

To further improve a data transmission rate, a massive carrier aggregation technology is introduced, to implement carrier aggregation of more CC, for example, carrier aggregation of 32 CC. However, according to an existing DC technology, if a large quantity of CC are introduced, an independent PUCCH, layer 2 functional entity, and intermediate key need to be configured for each SCG, and a quantity of parameters that UE needs to maintain abruptly increases. As a result, complexity of a function of the UE is increased.

SUMMARY

Embodiments of the present disclosure provide a communication method, a network device, user equipment, and a communications system, so as to reduce complexity of UE.

According to a first aspect, an embodiment of the present disclosure provides a communication method, including determining, by a network device, to allocate a first SCG to user equipment, and sending, by the network device, first configuration indication information to the user equipment, where the first configuration indication information is used to indicate at least one type of the following configuration transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

In a first possible implementation, the first cell is a PSCell in the second SCG of the user equipment.

With reference to the foregoing possible implementation, in a second possible implementation, the first configuration indication information includes at least one of the following information identification information of the second SCG of the user equipment or identification information of the first cell.

With reference to the foregoing possible implementations, in a third possible implementation, the layer 2 functional entity includes at least one of a Media Access Control entity, a Radio Link Control entity, or a Packet Data Convergence Protocol entity.

With reference to the foregoing possible implementations, in a fourth possible implementation, the first configuration indication information is further used to indicate establishing, in the second SCG of the user equipment, at least one of a Packet Data Convergence Protocol entity or a Radio Link Control entity that corresponds to a bearer of the first SCG, and the processing data transmission on at least one cell in the first SCG by using a layer 2 functional entity located in the second SCG includes processing data transmission on the bearer of the first SCG by using at least one of the Packet Data Convergence Protocol entity or the Radio Link Control entity that is established in the second SCG and that corresponds to the bearer.

With reference to the foregoing possible implementations, in a fifth possible implementation, the first configuration indication information is further used to indicate establishing a split bearer of the first SCG and the second SCG and indicate a SCG, used to perform a split operation, in the first SCG and the second SCG.

With reference to the foregoing possible implementations, in a sixth possible implementation, the network device is a MeNB, the user equipment has at least two serving base stations including the MeNB and a first SeNB, and the first SCG is associated with the first SeNB, before the sending, by the network device, first configuration indication information to the user equipment, the method further includes sending, by the MeNB, second configuration indication information to the first SeNB, where the second configuration indication information is used to indicate a configuration parameter of the first SCG that is determined by the MeNB, and the configuration parameter includes at least one of a PUCCH of the cell in the first SCG or a layer 2 functional entity corresponding to the data transmission on the at least one cell in the first SCG, and receiving, by the MeNB, a configuration response message that is sent by the first SeNB according to the second configuration indication information, and the sending, by the network device, first configuration indication information to the user equipment includes sending, by the MeNB, the first configuration indication information to the user equipment according to the configuration response message.

With reference to the foregoing possible implementation, in a seventh possible implementation, the configuration response message carries a configuration parameter of the first SCG that is determined by the first SeNB according to the second configuration indication information, and the sending, by the network device, the first configuration indication information to the user equipment according to the configuration response message includes determining, by the MeNB, at least one type of the following configuration according to the configuration response message transmitting the uplink control information of the cell in the first SCG by using the PUCCH of the first cell, or processing the data transmission on the at least one cell in the first SCG by using the layer 2 functional entity located in the second SCG.

With reference to the foregoing possible implementations, in an eighth possible implementation, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

According to a second aspect, another communication method is provided, including determining, by a network device, to allocate a first cell group to user equipment, where the first cell group is a SCG, and sending, by the network device, first configuration indication information to the user equipment, where the first configuration indication information is used to indicate at least one type of the following configuration, in a data transmission process in at least one cell in the first cell group, generating an encryption key by using a security configuration parameter of a second cell group of the user equipment, or in a data transmission process in at least one cell in the first cell group, performing uplink timing adjustment by using a timing advance value of a second cell group of the user equipment.

In a first possible implementation, the first cell group and the second cell group of the user equipment are associated with a same serving base station of the user equipment.

With reference to the foregoing possible implementation, in a second possible implementation, the second cell group of the user equipment is a MCG or a SCG.

With reference to the foregoing possible implementations, in a third possible implementation, the security configuration parameter includes at least one of the following parameters a SCG counter, a SCG intermediate key, an index value of a SCG intermediate key, or a serial number of a SCG intermediate key.

With reference to the foregoing possible implementations, in a fourth possible implementation, that the first configuration indication information is used to indicate, in a data transmission process in at least one cell in the first cell group, generating an encryption key by using a security configuration parameter of a second cell group of the user equipment includes. the first configuration indication information is used to indicate processing data transmission on the at least one cell in the first cell group by using a Packet Data Convergence Protocol entity located in the second cell group.

With reference to the foregoing possible implementations, in a fifth possible implementation, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same timing advance group (TAG), or the first configuration indication information is used to indicate that a PSCell in the first cell group of the user equipment and a PSCell or a PCell in the second cell group of the user equipment belong to a same TAG.

With reference to the foregoing possible implementations, in a sixth possible implementation, the network device is a first SeNB associated with both the first cell group and the second cell group, and the user equipment has at least two serving base stations including a MeNB and the first SeNB, before the sending, by the network device, first configuration indication information to the user equipment, the method further includes receiving, by the network device, second configuration indication information sent by the MeNB, where the second configuration indication information is used to instruct the first SeNB to allocate the first cell group to the user equipment, and the determining, by a network device, to allocate a first cell group to user equipment includes determining, by the network device according to the second configuration indication information, to allocate the first cell group to the user equipment.

According to a third aspect, another communication method is provided, including receiving, by user equipment, first configuration indication information sent by a network device, where the first configuration indication information is used to indicate at least one type of the following configuration transmitting uplink control information related to a cell in a first SCG of the user equipment by using a PUCCH of a first cell, where the first cell belongs to a second SCG of the user equipment, or processing data transmission on at least one cell in a first SCG of the user equipment by using a layer 2 functional entity located in the second SCG, and configuring, by the user equipment, the first SCG of the user equipment according to the first configuration indication information.

In a first possible implementation, the first cell is a PSCell in the second SCG of the user equipment.

With reference to the foregoing possible implementation, in a second possible implementation, the first configuration indication information includes at least one of the following information identification information of the second SCG of the user equipment or identification information of the first cell.

With reference to the foregoing possible implementations, in a third possible implementation, the layer 2 functional entity includes at least one of a Media Access Control entity, a Radio Link Control entity, or a Packet Data Convergence Protocol entity.

With reference to the foregoing possible implementation, in a fourth possible implementation, the first configuration indication information is further used to indicate establishing, in the second SCG, at least one of a Packet Data Convergence Protocol entity or a Radio Link Control entity that corresponds to a bearer of the first SCG, and the processing data transmission on at least one cell in a first SCG by using a layer 2 functional entity established in the second SCG of the user equipment includes processing data transmission on the bearer of the first SCG by using at least one of the Packet Data Convergence Protocol entity or the Radio Link Control entity that is established in the second SCG and that corresponds to the bearer.

With reference to the foregoing possible implementations, in a fourth possible implementation, the first configuration indication information is further used to indicate establishing a split bearer of the first SCG and the second SCG and indicate a SCG, used to perform a split operation, in the first SCG and the second SCG.

With reference to the foregoing possible implementations, in a fifth possible implementation, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

According to a fourth aspect, another communication method is provided, including receiving, by user equipment, first configuration indication information sent by a network device, where the first configuration indication information is used to indicate at least one type of the following configuration, in a data transmission process in at least one cell in a first cell group of the user equipment, generating an encryption key by using a security configuration parameter of a second cell group of the user equipment, or in a data transmission process in at least one cell in the first cell group, performing uplink timing adjustment by using a timing advance value of a second cell group of the user equipment, and configuring, by the user equipment, the first cell group according to the first configuration indication information.

In a first possible implementation, the first cell group of the user equipment and the second cell group of the user equipment are associated with a same serving base station of the user equipment.

With reference to the foregoing possible implementation, in a second possible implementation, the second cell group of the user equipment is a MCG or a SCG.

With reference to the foregoing possible implementations, in a third possible implementation, the security configuration parameter includes at least one of the following parameters a SCG counter, a SCG intermediate key, an index value of a SCG intermediate key, or a serial number of a SCG intermediate key.

With reference to the foregoing possible implementations, in a fourth possible implementation, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

With reference to the foregoing possible implementations, in a fifth possible implementation, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

With reference to the foregoing possible implementations, in a sixth possible implementation, the method further includes receiving, by the user equipment, second configuration indication information sent by the network device, where the second configuration indication information is used to indicate a random access resource allocated by the network device to the second cell group of the user equipment, performing, by the user equipment, a random access process in the second cell group according to the second configuration indication information, to obtain a timing advance value of the second cell group, and communicating, by the user equipment, with the serving base station of the user equipment in the first cell group according to the timing advance value of the second cell group.

According to a fifth aspect, a network device is provided, including a determining unit configured to determine to allocate a first SCG to user equipment, and a sending unit configured to send first configuration indication information to the user equipment, where the first configuration indication information is used to indicate at least one type of the following configuration transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

In a first possible implementation, the first cell is a PSCell in the second SCG of the user equipment.

With reference to the foregoing possible implementation, in a second possible implementation, the first configuration indication information includes at least one of the following information identification information of the second SCG of the user equipment or identification information of the first cell.

With reference to the foregoing possible implementations, in a third possible implementation, the layer 2 functional entity includes at least one of a Media Access Control entity, a Radio Link Control entity, or a Packet Data Convergence Protocol entity.

With reference to the foregoing possible implementations, in a fourth possible implementation, the first configuration indication information is further used to indicate establishing, in the second SCG of the user equipment, at least one of a Packet Data Convergence Protocol entity or a Radio Link Control entity that corresponds to a bearer of the first SCG, and the processing data transmission on at least one cell in the first SCG by using a layer 2 functional entity located in the second SCG includes processing data transmission on the bearer of the first SCG by using at least one of the Packet Data Convergence Protocol entity or the Radio Link Control entity that is established in the second SCG and that corresponds to the bearer.

With reference to the foregoing possible implementations, in a fifth possible implementation, the first configuration indication information is further used to indicate establishing a split bearer of the first SCG and the second SCG and indicate a SCG, used to perform a split operation, in the first SCG and the second SCG.

With reference to the foregoing possible implementations, in a sixth possible implementation, the network device is a MeNB, the user equipment has at least two serving base stations including the MeNB and a first SeNB, and the first SCG is associated with the first SeNB, the sending unit is further configured to, before sending the first configuration indication information to the user equipment, send second configuration indication information to the first SeNB, where the second configuration indication information is used to indicate a configuration parameter of the first SCG that is determined by the MeNB, and the configuration parameter includes at least one of a PUCCH of the cell in the first SCG or a layer 2 functional entity corresponding to the data transmission on the at least one cell in the first SCG, the MeNB further includes a second receiving unit configured to receive a configuration response message that is sent by the first SeNB according to the second configuration indication information sent by the sending unit, and the sending unit is specifically configured to send the first configuration indication information to the user equipment according to the configuration response message received by the second receiving unit.

With reference to the foregoing possible implementations, in a seventh possible implementation, the configuration response message is used to indicate a configuration parameter of the first SCG that is determined by the first SeNB according to the second configuration indication information, and the sending unit includes a determining subunit configured to determine at least one type of the following configuration according to the configuration response message received by the second receiving unit transmitting the uplink control information of the cell in the first SCG by using the PUCCH of the first cell, or processing the data transmission on the at least one cell in the first SCG by using the layer 2 functional entity located in the second SCG.

With reference to the foregoing possible implementations, in an eighth possible implementation, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

According to a sixth aspect, another network device is provided, including a determining unit configured to determine to allocate a first cell group to user equipment, where the first cell group is a SCG, and a sending unit configured to send first configuration indication information to the user equipment, where the first configuration indication information is used to indicate at least one type of the following configuration, in a data transmission process in at least one cell in the first cell group, generating an encryption key by using a security configuration parameter of a second cell group of the user equipment, or in a data transmission process in at least one cell in the first cell group, performing uplink timing adjustment by using a timing advance value of a second cell group of the user equipment.

In a first possible implementation, the first cell group and the second cell group are associated with a same serving base station of the user equipment.

With reference to the foregoing possible implementation, in a second possible implementation, the second cell group of the user equipment is a MCG or a SCG.

With reference to the foregoing possible implementations, in a third possible implementation, the security configuration parameter includes at least one of the following parameters a SCG counter, a SCG intermediate key, an index value of a SCG intermediate key, or a serial number of a SCG intermediate key.

With reference to the foregoing possible implementations, in a fourth possible implementation, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

With reference to the foregoing possible implementations, in a fifth possible implementation, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

With reference to the foregoing possible implementations, in a sixth possible implementation, the network device is a first SeNB associated with both the first cell group and the second cell group, and the user equipment has at least two serving base stations including a MeNB and the first SeNB, the first SeNB further includes a second receiving unit configured to, before the sending unit sends the first configuration indication information to the user equipment, receive second configuration indication information sent by the MeNB, where the second configuration indication information is used to instruct the first SeNB to allocate the first cell group to the user equipment, and the determining unit is further configured to determine, according to the second configuration indication information received by the second receiving unit, to allocate the first cell group to the user equipment.

According to a seventh aspect, user equipment is provided, including a receiving unit configured to receive first configuration indication information sent by a network device, where the first configuration indication information is used to indicate at least one type of the following configuration transmitting uplink control information related to a cell in a first SCG of the user equipment by using a PUCCH of a first cell, where the first cell belongs to a second SCG of the user equipment, or processing data transmission on at least one cell in a first SCG of the user equipment by using a layer 2 functional entity located in the second SCG, and a configuration unit configured to configure the first SCG according to the first configuration indication information received by the receiving unit.

In a first possible implementation, the first cell is a PSCell in the second SCG of the user equipment.

With reference to the foregoing possible implementation, in a second possible implementation, the first configuration indication information includes at least one of the following information identification information of the second SCG of the user equipment or identification information of the first cell.

With reference to the foregoing possible implementations, in a third possible implementation, the layer 2 functional entity includes at least one of a Media Access Control entity, a Radio Link Control entity, or a Packet Data Convergence Protocol entity.

With reference to the foregoing possible implementations, in a fourth possible implementation, the first configuration indication information is further used to indicate establishing, in the second SCG, at least one of a Packet Data Convergence Protocol entity or a Radio Link Control entity that corresponds to a bearer of the first SCG, and the processing data transmission on at least one cell in a first SCG by using a layer 2 functional entity established in the second SCG of the user equipment includes processing data transmission on the bearer of the first SCG by using at least one of the Packet Data Convergence Protocol entity or the Radio Link Control entity that is established in the second SCG and that corresponds to the bearer.

With reference to the foregoing possible implementations, in a fifth possible implementation, the first configuration indication information is further used to indicate establishing a split bearer of the first SCG and the second SCG and indicate a SCG, used to perform a split operation, in the first SCG and the second SCG.

With reference to the foregoing possible implementations, in a sixth possible implementation, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

According to an eighth aspect, another user equipment is provided, including a receiving unit configured to receive first configuration indication information sent by a network device, where the first configuration indication information is used to indicate at least one type of the following configuration, in a data transmission process in at least one cell in a first cell group of the user equipment, generating an encryption key by using a security configuration parameter of a second cell group of the user equipment, or in a data transmission process in at least one cell in the first cell group, performing uplink timing adjustment by using a timing advance value of a second cell group of the user equipment, and a configuration unit configured to configure the first cell group according to the first configuration indication information received by the receiving unit.

In a first possible implementation, the first cell group and the second cell group are associated with a same serving base station of the user equipment.

With reference to the foregoing possible implementation, in a second possible implementation, the second cell group of the user equipment is a MCG or a SCG.

With reference to the foregoing possible implementations, in a third possible implementation, the security configuration parameter includes at least one of the following parameters a SCG counter, a SCG intermediate key, an index value of a SCG intermediate key, or a serial number of a SCG intermediate key.

With reference to the foregoing possible implementations, in a fourth possible implementation, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

With reference to the foregoing possible implementations, in a fifth possible implementation, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

With reference to the foregoing possible implementations, in a sixth possible implementation, the receiving unit is further configured to receive second configuration indication information sent by the network device, where the second configuration indication information is used to indicate a random access resource allocated by the network device to the second cell group of the user equipment, and the user equipment further includes a random access unit configured to perform a random access process in the second cell group according to the second configuration indication information received by the receiving unit, to obtain a timing advance value of the second cell group, and a communications unit configured to communicate with the serving base station of the user equipment in the first cell group according to the timing advance value of the second cell group that is obtained by the random access unit.

According to a ninth aspect, a communications system is provided, including user equipment and at least one serving base station of the user equipment, where multiple cell groups are configured for the user equipment, and a first serving base station in the at least one serving base station of the user equipment is associated with at least two cell groups of the multiple cell groups.

In a first possible implementation, the multiple cell groups include a first SCG and a second cell group, where the second cell group is a MCG or a SCG, and the first SCG and the second cell group meet at least one type of the following configuration transmitting uplink control information related to a cell in the first SCG by using a PUCCH of a first cell, where the first cell belongs to the second cell group of the user equipment, processing data transmission on at least one cell in the first SCG by using a layer 2 functional entity located in the second cell group, processing data transmission on at least one cell in the first SCG by using a security configuration parameter of the second cell group of the user equipment, or processing data transmission on at least one cell in the first SCG by using a timing advance value of the second cell group of the user equipment.

With reference to the foregoing possible implementation, in a second possible implementation, the first SCG and the second cell group are associated with a same serving base station of the user equipment.

With reference to the foregoing possible implementations, in a third possible implementation, the at least one serving base station of the user equipment is specifically one serving base station of the user equipment, and the multiple cell groups of the user equipment are all associated with the one serving base station of the user equipment.

With reference to the foregoing possible implementations, in a fourth possible implementation, the at least one serving base station of the user equipment includes a MeNB and at least one SeNB, where the MeNB is associated with a MCG of the multiple cell groups, and each of the at least one SeNB is associated with one or more SCGs of the multiple cell groups.

With reference to the foregoing possible implementation, in a fifth possible implementation, the MeNB is further associated with one or more SCGs of the multiple cell groups.

According to a tenth aspect, another network device is provided, including a processor configured to determine to allocate a first SCG to user equipment, and a transmitter configured to send first configuration indication information to the user equipment, where the first configuration indication information is used to indicate at least one type of the following configuration transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

According to an eleventh aspect, another network device is provided, including a processor configured to determine to allocate a first cell group to user equipment, where the first cell group is a SCG, and a transmitter configured to send first configuration indication information to the user equipment, where the first configuration indication information is used to indicate at least one type of the following configuration, in a data transmission process in at least one cell in the first cell group, generating an encryption key by using a security configuration parameter of a second cell group of the user equipment, or in a data transmission process in at least one cell in the first cell group, performing uplink timing adjustment by using a timing advance value of a second cell group of the user equipment.

According to a twelfth aspect, another user equipment is provided, including a receiver configured to receive first configuration indication information sent by a network device, where the first configuration indication information is used to indicate at least one type of the following configuration transmitting uplink control information related to a cell in a first SCG of the user equipment by using a PUCCH of a first cell, where the first cell belongs to a second SCG of the user equipment, or processing data transmission on at least one cell in a first SCG of the user equipment by using a layer 2 functional entity located in the second SCG, and a processor configured to configure the first SCG according to the first configuration indication information received by the receiver.

According to a thirteenth aspect, another user equipment is provided, including a receiver configured to receive first configuration indication information sent by a network device, where the first configuration indication information is used to indicate at least one type of the following configuration, in a data transmission process in at least one cell in a first cell group of the user equipment, generating an encryption key by using a security configuration parameter of a second cell group of the user equipment, or in a data transmission process in at least one cell in the first cell group, performing uplink timing adjustment by using a timing advance value of a second cell group of the user equipment, and a processor configured to configure the first cell group according to the first configuration indication information received by the receiver.

Based on the foregoing technical solutions, in the communication method provided by the embodiments of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

BRIEF DESCRIPTION OF DRAWINGS

To describe the technical solutions in the embodiments of the present disclosure more clearly, the following briefly describes the accompanying drawings required for describing the embodiments of the present disclosure or the prior art. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
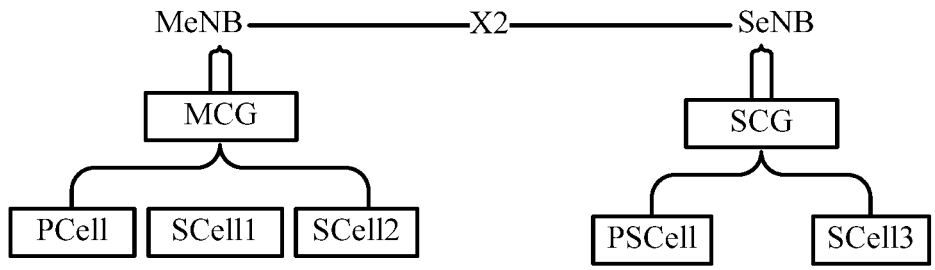
FIG. 1 is a schematic diagram of a DC scenario in the prior art.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM) system, a Code Division Multiple Access (CDMA) system, a Wideband Code Division Multiple Access (WCDMA) system, a general packet radio service (GPRS), a LTE system, an LTE frequency division duplex (FDD) system, an LTE time division duplex (TDD) system, a Universal Mobile Telecommunications System (UMTS), and a Worldwide Interoperability for Microwave Access (WiMAX) communications system.

It should also be understood that in the embodiments of the present disclosure, user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a cellular phone) or a computer with a mobile terminal. For example, the user equipment may also be a portable, pocket-sized, handheld, computer built-in, or in-vehicle mobile apparatus, which exchanges voice and/or data with the radio access network.

It should also be understood that in the embodiments of the present disclosure, a base station may be a base transceiver station (BTS) in GSM or CDMA, or may be a NodeB in WCDMA, or may be an evolved NodeB (eNB, or e-NodeB) in LTE, which is not limited in the present disclosure.

It should also be understood that assuming that UE has only one serving base station, a bearer in the embodiments of the present disclosure may have the following types.

Bearer type 1. A bearer that has a radio protocol stack (or an L2 entity or an L2 protocol stack) located in an MCG and an SCG and that uses resources of both the MCG and the SCG. The MCG and the SCG are both associated with the serving base station.

Bearer type 2. A bearer that has a radio protocol stack (or an L2 entity or an L2 protocol stack) located in a first SCG and a second SCG and that uses resources of both the first SCG and the second SCG. The first SCG and the second SCG are both associated with the serving base station.

Assuming that UE has multiple serving base stations, a bearer in the embodiments of the present disclosure may further have the following types.

Bearer type 3 (split bearer). A bearer that has a radio protocol stack (or an L2 entity or an L2 protocol stack) located in an MeNB (or an MCG) and an SeNB (or an SCG) and that uses only a resource of the SeNB (or a resource of the SCG).

Bearer type 4. A bearer that has a radio protocol stack (or an L2 entity or an L2 protocol stack) located in an MeNB and an SeNB and that uses resources of both the MeNB and the SeNB.

Bearer type 5. A bearer that has a radio protocol stack (or an L2 entity or an L2 protocol stack) located in a first SeNB (or a first SCG) and a second SeNB (or a second SCG) and that uses only a resource of the second SeNB (or the second SCG).

Bearer type 6 (split bearer). A bearer that has a radio protocol stack (or an L2 entity or an L2 protocol stack) located in a first SeNB (or a first SCG) and a second SeNB (or a second SCG) and that uses resources of both the first SeNB and the second SeNB.

Figure 2:
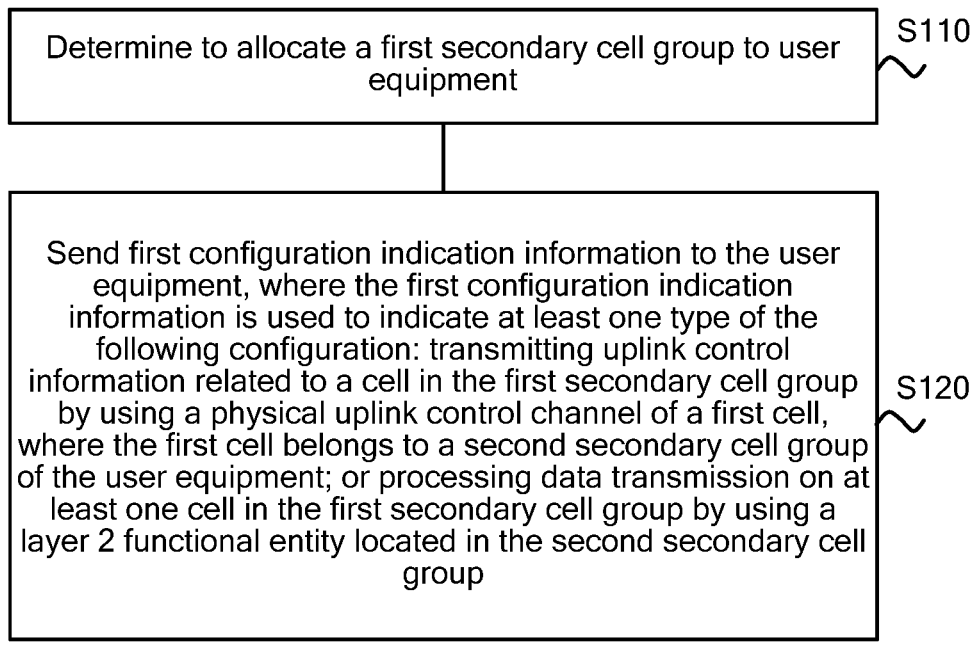
FIG. 2 is a schematic flowchart of a communication method according to an embodiment of the present disclosure.

FIG. 2 is a schematic flowchart of a communication method 100 according to an embodiment of the present disclosure. The method 100 may be performed by a network side device such as a base station, a base station controller, or a network side server. However, this embodiment of the present disclosure is not limited thereto. As shown in FIG. 2, the method 100 includes the following steps.

S110. Determine to allocate a first SCG to user equipment.

S120. Send first configuration indication information to the user equipment, where the first configuration indication information is used to indicate at least one type of the following configuration transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

Therefore, according to the communication method in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

The network device may allocate the second SCG to the user equipment before allocating the first SCG to the user equipment, and the second SCG may have or have not been configured for the user equipment. Alternatively, the network device may allocate the second SCG to the user equipment when allocating the first SCG to the user equipment. In this case, the first configuration indication information may be further used to indicate a configuration parameter of the second SCG that is determined by the network device. Data transmission on at least one cell in the second SCG may be processed by using a layer 2 functional entity located in the second SCG, and an independent PUCCH resource may have been configured for the second SCG. This is not limited in this embodiment of the present disclosure.

Optionally, the transmitting uplink control information related to a cell in the first SCG by using a PUCCH of a first cell includes transmitting an uplink control channel information related to a PSCell in the first SCG by using the PUCCH of the first cell, and transmitting an uplink control channel information related to a secondary cell in the first SCG by using the PUCCH of the first cell.

The first configuration indication information may be used to indicate transmitting the uplink control information related to the cell in the first SCG on the PUCCH of the first cell. In this case, no independent PUCCH resource is configured for the first SCG. That is, no independent PUCCH resource is configured for the PSCell in the first SCG, and a PUCCH resource of the second SCG is shared by the first SCG and the second SCG. In addition, the data transmission on the at least one cell in the first SCG may be processed by a layer 2 functional entity located in the first SCG, and the user equipment needs to establish, in the first SCG, a layer 2 functional entity corresponding to the data transmission on the at least one cell in the first SCG.

Alternatively, the first configuration indication information may be used to indicate processing the data transmission on the at least one cell in the first SCG by using the layer 2 functional entity located in the second SCG. In this case, an independent PUCCH resource is configured for the first SCG. For example, a PUCCH resource is configured for a PSCell in the first SCG. The uplink control information related to the cell in the first SCG may be transmitted by using the PUCCH configured for the first SCG. In addition, the data transmission on the at least one cell in the first SCG may be processed by the layer 2 functional entity located in the second SCG. The layer 2 functional entity located in the second SCG may have been established or may be newly established by the user equipment for the data transmission. The user equipment does not need to establish, in the first SCG, a layer 2 functional entity corresponding to the data transmission on the at least one cell in the first SCG. However, this embodiment of the present disclosure is not limited thereto.

Alternatively, the first configuration indication information may be used to indicate transmitting the uplink control information related to the cell in the first SCG by using the PUCCH of the first cell and indicate processing the data transmission on the at least one cell in the first SCG by using the layer 2 functional entity located in the second SCG. In this case, the first SCG and the second SCG share a PUCCH resource of the second SCG, and the user equipment does not need to establish, in the first SCG, a layer 2 functional entity corresponding to the data transmission on the at least one cell in the first SCG.

The first cell may be a PSCell in the second SCG or a secondary cell in the second SCG, and a PUCCH is configured for the first cell. Optionally, the first cell is the PSCell in the second SCG.

Optionally, the uplink control information includes at least one of the following information ACK, NACK, or CSI. However, this embodiment of the present disclosure is not limited thereto.

Optionally, the layer 2 functional entity may include at least one of a Media Access Control entity, a Radio Link Control entity, or a Packet Data Convergence Protocol entity. However, this embodiment of the present disclosure is not limited thereto.

In this embodiment of the present disclosure, the first configuration indication information explicitly or implicitly indicates the foregoing configuration of the first SCG. In an optional embodiment, the first configuration indication information may include at least one of the following information identification information of the second SCG or identification information of the first cell, to implicitly indicate the foregoing configuration of the first SCG. For example, the foregoing information may be carried in a particular field of a configuration message. Correspondingly, when receiving the configuration message, the user equipment may, according to the foregoing information carried in the particular field, transmit the uplink control information related to the cell in the first SCG by using the PUCCH of the first cell, and/or process the data transmission on the at least one cell in the first SCG by using the layer 2 functional entity located in the second SCG. However, this embodiment of the present disclosure is not limited thereto.

In this embodiment of the present disclosure, the user equipment may have one or more serving base stations, and a MCG and multiple SCGs are configured for the user equipment. In an optional embodiment, the network device may also determine a serving base station of the user equipment, with which the first SCG is associated. If the user equipment has multiple serving base stations, the first SCG may be associated with a MeNB of the multiple serving base stations or associated with a SeNB of the multiple serving base stations. This is not limited in this embodiment of the present disclosure. Correspondingly, the first configuration indication information may be further used to indicate a base station associated with the first SCG.

In an optional embodiment, all cell groups configured for the user equipment are associated with a same serving base station of the user equipment.

Figure 3:
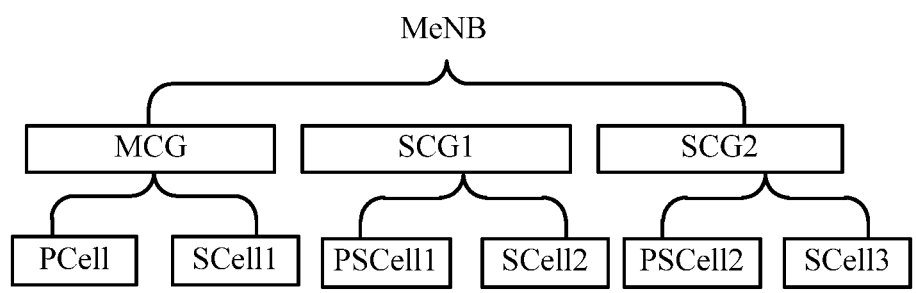
FIG. 3 is a schematic diagram of an example of an application scenario according to an embodiment of the present disclosure.

In this case, zero or at least one cell group that has been configured for the user equipment and at least one cell group newly allocated by the network device to the user equipment may be associated with a same serving base station. The serving base station may be a unique serving base station of the user equipment or a MeNB in multiple serving base stations of the user equipment. This embodiment of the present disclosure is not limited thereto. For example, as shown in FIG. 3, the MCG, the first SCG, and the second SCG of the user equipment are all associated with the unique serving base station of the user equipment.

In another optional embodiment, the user equipment has multiple serving base stations, and the first SCG and the second SCG are associated with different base stations.

Figure 4:
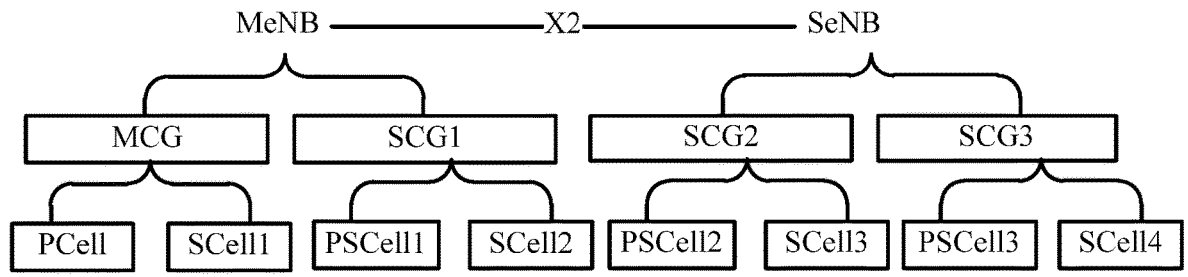
FIG. 4 is a schematic diagram of another example of an application scenario according to an embodiment of the present disclosure.
Figure 5:
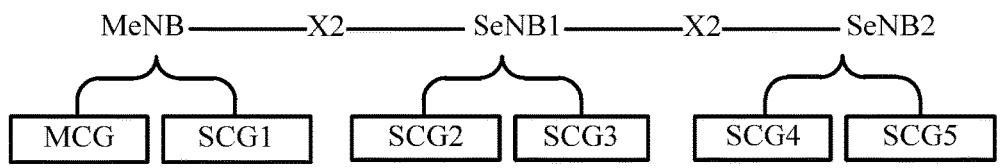
FIG. 5 is a schematic diagram of another example of an application scenario according to an embodiment of the present disclosure.

As shown in FIG. 4 and FIG. 5, the multiple serving base stations of the user equipment may include a MeNB and at least one SeNB. There is an RRC connection between the user equipment and the MeNB. There is a common radio connection between the user equipment and each of the at least one SeNB. In addition, there may be a non-ideal backhaul (non-ideal backhaul) link between the MeNB and the at least one SeNB, and the MeNB communicates with the at least one SeNB by using an X2 interface. In this case, the MeNB of the user equipment may be associated with the MCG and zero or at least one SCG of the user equipment. Each of the at least one SeNB may be associated with zero or at least one SCG. However, this embodiment of the present disclosure is not limited thereto.

If the multiple serving base stations of the user equipment include a MeNB and at least one SeNB, the first SCG and the second SCG may be associated with a same base station or different base stations. In an embodiment, the first SCG may be associated with the MeNB, and the second SCG is associated with the MeNB or the SeNB. Alternatively, the first SCG and the second SCG may be both associated with a same SeNB of the at least one SeNB. Alternatively, the first SCG may be associated with a first SeNB of the at least one SeNB, and the second SCG is associated with the MeNB or a second SeNB, different from the first SeNB, included in the at least one SeNB. This embodiment of the present disclosure is not limited thereto.

In another optional embodiment, if the serving base station associated with the first SCG controls multiple cells, the network device may also determine at least one cell included in the first SCG. The first SCG may include some or all cells controlled by the associated serving base station. In addition, if the first SCG includes multiple cells, the network device may also determine which of the multiple cells serves as the PSCell in the first SCG. Correspondingly, the first configuration indication information may be further used to indicate at least one cell included in the first SCG, or be further used to indicate a PSCell in at least one cell included in the first SCG. However, this embodiment of the present disclosure is not limited thereto.

In an optional embodiment, the first configuration indication information may be used to indicate whether the first SCG has an independent PUCCH resource. If the first SCG does not have an independent PUCCH resource, the first configuration indication information is used to instruct the first SCG and the second SCG to share a PUCCH configured for the second SCG. That is, the uplink control information related to the cell in the first SCG is transmitted by using the PUCCH of the first cell. In this case, none of the cells included in the first SCG has an independent PUCCH resource. The PSCell in the first SCG does not have an independent PUCCH resource either, but the PSCell in the first SCG may serve as a downlink timing reference cell in the first SCG. This is not limited in this embodiment of the present disclosure.

In another optional embodiment, the first configuration indication information may be used to indicate whether to establish, in the first SCG, a layer 2 functional entity configured to process the data transmission on the at least one cell in the first SCG. If a layer 2 functional entity configured to process the data transmission on the at least one cell in the first SCG does not need to be established in first SCG, the first configuration indication information may indicate processing the data transmission on the at least one cell in the first SCG by using the layer 2 functional entity located in the second SCG. The layer 2 functional entity may include at least one of the following a Media Access Control (MAC) entity, a Radio Link Control (RLC) entity, or a Packet Data Convergence Protocol (PDCP) entity. The MAC entity may be established when the user equipment initially configures the first SCG, and the RLC entity and the PDCP entity may be established when a bearer of the first SCG is created.

Optionally, the first configuration indication information may include identification information of the second SCG and/or identification information of a PSCell in the second SCG, to implicitly indicate processing the data transmission on the at least one cell in the first SCG by using the layer 2 functional entity located in the second SCG. The first configuration indication information may indicate together whether a MAC entity, an RLC entity, and a PDCP entity that are configured to process the data transmission on the at least one cell in the first SCG need to be established in the first SCG. Alternatively, the first configuration indication information may separately indicate whether each of the foregoing entities configured to process the data transmission on the at least one cell in the first SCG needs to be established in the first SCG. However, this embodiment of the present disclosure is not limited thereto.

In an optional embodiment, the first configuration indication information may be used to indicate processing the data transmission on the at least one cell in the first SCG by using an RLC entity and a PDCP entity that are located in the second SCG, while a MAC entity configured to process the data transmission on the at least one cell in the first SCG may be located in the first SCG. However, this embodiment of the present disclosure is not limited thereto.

In another optional embodiment, the first configuration indication information is further used to indicate establishing, in the second SCG, at least one of a PDCP entity or an RLC entity that corresponds to a bearer of the first SCG.

The processing data transmission on at least one cell in the first SCG by using a layer 2 functional entity located in the second SCG of the user equipment includes processing data transmission on the bearer of the first SCG by using at least one of the PDCP entity or the RLC entity that is established in the second SCG and that corresponds to the bearer.

In an embodiment, the first configuration indication information may be used to indicate establishing, in the second SCG, the PDCP entity corresponding to the bearer of the first SCG, and processing the data transmission on the bearer by using the PDCP entity that is established in the second SCG and that corresponds to the bearer. Alternatively, the first configuration indication information may be used to indicate establishing, in the second SCG, the PDCP entity and the RLC entity that correspond to the bearer of the first SCG, and processing the data transmission on the bearer by using the PDCP entity and the RLC entity that are established in the second SCG and that correspond to the bearer. However, this embodiment of the present disclosure is not limited thereto.

In this embodiment of the present disclosure, the bearer of the first SCG may be a bearer that uses a resource of the first SCG. Optionally, the bearer of the first SCG may use only a resource of the first SCG. In this case, a layer 2 functional entity of the bearer of the first SCG may be located in the first SCG or the second SCG. However, this embodiment of the present disclosure is not limited thereto.

Optionally, if the second SCG has been configured, the bearer of the first SCG may have been established in the second secondary cell. After the first SCG is configured, transmission of the bearer may be performed in both the second secondary cell and the first SCG. Alternatively, the bearer of the first SCG may be established after the first SCG is configured. This embodiment of the present disclosure is not limited thereto.

Alternatively, the bearer of the first SCG may use resources of the first SCG and another cell group (which may be a MCG or a SCG). The another cell group and the first SCG may be associated with a same base station. In this case, a layer 2 functional entity of the bearer of the first SCG may be located in the first SCG and the another cell group or located in the second SCG and the another cell group. However, this embodiment of the present disclosure is not limited thereto.

Alternatively, the bearer of the first SCG may use resources of the first SCG and another cell group (which may be a MCG or a SCG). The another SCG and the first SCG may be associated with different base stations. In this case, the bearer of the first SCG is a split bearer, and a layer 2 functional entity of the split bearer may be located in the first SCG and the another cell group or located in the second SCG and the another cell group. However, this embodiment of the present disclosure is not limited thereto.

In another optional embodiment, the first configuration indication information is further used to indicate establishing a split bearer of the first SCG and the second SCG and indicate a SCG, used to perform a split operation, in the first SCG and the second SCG.

In the split bearer, a part of a data packet is transmitted by using the first SCG, and the other part is transmitted by using the second SCG. That is, the split bearer uses resources of the first SCG and the second SCG. In this case, a layer 2 functional entity of the split bearer may be located only in the first SCG, be located only in the second SCG, or be located in the first SCG and the second SCG. This embodiment of the present disclosure is not limited thereto. Further, the first configuration indication information may indicate a cell group, which performs the split operation, in the first SCG and the second SCG. That is, the data packet is split into two parts that are respectively transmitted by using the first SCG and the second SCG. However, this embodiment of the present disclosure is not limited thereto.

Alternatively, the first configuration indication information is further used to instruct the first SCG and the second SCG to establish a split bearer and indicate a SCG corresponding to a layer 2 functional entity that performs a split operation of the split bearer or indicate a SCG, in which the layer 2 functional entity (or a Radio Link Protocol entity) of the split bearer is located, of the first SCG and the second SCG. In an embodiment, if the split bearer is split at a PDCP layer, the first configuration indication information may indicate an SCG corresponding to the PDCP layer at which the bearer is split, that is, an SCG, corresponding to the PDCP layer at which the split operation is performed, of a first SCG and a second SCG, or indicate a SCG, in which a PDCP entity of the split bearer is located, of the first SCG and the second SCG. The PDCP entity of the split bearer may be located in at least one SCG of the first SCG and the second SCG. Alternatively, if the split bearer is split at an RLC layer, the SCG configuration information may indicate an SCG corresponding to the RLC layer at which the bearer is split, that is, an SCG, corresponding to the RLC layer at which the split operation is performed, of a first SCG and a second SCG, or indicate a SCG, in which an RLC entity of the split bearer is located, of the first SCG and the second SCG. The RLC entity of the split bearer may be located in at least one SCG of the first SCG and the second SCG. However, this embodiment of the present disclosure is not limited thereto.

After receiving the first configuration indication information, the user equipment may establish a correspondence between the first SCG and the second SCG, configure the first SCG according to the first configuration indication information, and send a configuration complete message to the network device after completing configuring the first SCG.

In another optional embodiment, the method 100 further includes receiving a configuration complete message that is sent by the user equipment according to the first configuration indication information.

In another optional embodiment, if the network device is a MeNB of the user equipment, and the first SCG is associated with the first SeNB of the user equipment, before S120, the method 100 further includes sending second configuration indication information to the first SeNB, where the second configuration indication information is used to indicate a configuration parameter of the first SCG that is determined by the network device, and the configuration parameter includes at least one of a PUCCH of the first SCG or a layer 2 functional entity corresponding to the data transmission on the at least one cell in the first SCG, and receiving a configuration response message that is sent by the first SeNB according to the second configuration indication information.

Correspondingly, S120 of sending first configuration indication information to the user equipment includes sending the first configuration indication information to the user equipment according to the configuration response message.

In this embodiment of the present disclosure, the configuration parameter of the first SCG may be independently determined by the MeNB, and the MeNB notifies the first SeNB of the configuration parameter of the first SCG. In this case, the second configuration indication information may be used to notify the first SeNB of the configuration parameter determined by the network device. After receiving the second configuration indication information, the first SeNB may determine the configuration parameter of the first SeNB that is indicated in the second configuration indication information and send a configuration response message to the MeNB, to determine that the first SeNB has received the second configuration indication information.

Alternatively, a configuration parameter of the first SCG may be determined by the MeNB and the first SeNB by means of negotiation. In this case, the second configuration indication information may be used to indicate the configuration parameter of the first SCG that is determined by the first SeNB. After receiving the second configuration indication information, the first SeNB may agree upon the configuration parameter determined by the MeNB, or modify the configuration parameter determined by the MeNB, add the configuration parameter determined by the first SeNB into the configuration response message and send the configuration response message to the MeNB. In the configuration parameter of the first SCG that is determined by the first SeNB, the uplink control information related to the cell in the first SCG is transmitted by using the PUCCH of the first cell, and/or the data transmission on the at least one cell in the first SCG is processed by using the layer 2 functional entity located in the second SCG. The MeNB may obtain the configuration parameter of the first SCG that is determined by the first SeNB and that is carried in the configuration response message, determine, according to the configuration response message, that the uplink control information related to the cell in the first SCG is transmitted by using the PUCCH of the first cell, and/or the data transmission on the at least one cell in the first SCG is processed by the layer 2 functional entity located in the second SCG, and send the configuration parameter of the first secondary cell that is determined according to the configuration response message to the user equipment. However, this embodiment of the present disclosure is not limited thereto.

In another optional embodiment, the configuration response message carries a configuration parameter of the first SCG that is determined by the first SeNB according to the second configuration indication information, and the configuration response message indicates at least one type of the following configuration transmitting the uplink control information of the cell in the first SCG by using the PUCCH of the first cell, or processing the data transmission on the at least one cell in the first SCG by using the layer 2 functional entity located in the second SCG. The configuration parameter of the first SCG that is determined by the first SeNB may be different from the configuration parameter of the first SCG that is determined by the MeNB. Correspondingly, the sending the first configuration indication information to the user equipment according to the configuration response message includes determining at least one type of the following configuration according to the second configuration indication information transmitting the uplink control information of the cell in the first SCG by using the PUCCH of the first cell, or processing the data transmission on the at least one cell in the first SCG by using the layer 2 functional entity located in the second SCG.

In another optional embodiment, the first configuration indication information is further used to indicate at least one type of the following configuration. in a data transmission process in at least one cell in a first cell group, generating an encryption key by using a security configuration parameter of a second cell group of the user equipment, or in a data transmission process in at least one cell in the first cell group, performing uplink timing adjustment by using a timing advance value of a second cell group of the user equipment.

The first SCG and the second SCG may share a security configuration parameter and/or a timing advance value. In this case, the first SCG and the second SCG may be associated with a same serving base station of the user equipment. However, this embodiment of the present disclosure is not limited thereto. Optionally, the first SCG and the second SCG may use a same security configuration parameter. The security configuration parameter may be allocated by a network side to the first SCG, and in this case, the network side does not allocate an independent security configuration parameter to the second SCG. Alternatively, the security configuration parameter may be allocated by a network side to the second SCG, and in this case, the network side does not allocate an independent security configuration parameter to the first SCG. Alternatively, the security configuration parameter may be allocated by a network side to another cell group of the user equipment, the network side does not allocate an independent security configuration parameter to the first SCG and the second SCG, and the another cell group, the first SCG, and the second SCG may be associated with a same serving base station. However, this embodiment of the present disclosure is not limited thereto.

In an optional embodiment, the first configuration indication information is used to instruct the first SCG to generate an encryption key by using a security configuration parameter of the second SCG.

The security configuration parameter may include at least one of the following parameters a SCG counter, a SCG intermediate key (or Secondary eNB intermediate key, S-KeNB), an index value of a SCG intermediate key, or a serial number of a SCG intermediate key. The SCG intermediate key may be determined according to a MeNB intermediate key (KeNB) and a secondary cell counter. In this case, the first configuration indication information may include identification information of the second SCG or include at least one of the following information a SCG intermediate key of the second SCG, an index value of a SCG intermediate key of the second SCG, a serial number of a SCG intermediate key of the second SCG, or an SCG counter (counter) of the second SCG. In addition, the first configuration indication information may further instruct the first SCG and the second SCG to use a same encryption algorithm. However, this embodiment of the present disclosure is not limited thereto.

Optionally, because the PDCP entity has a function of managing a SCG intermediate key, the first configuration indication information may implicitly indicate, by indicating processing the data transmission on the at least one cell in the first cell group by using a PDCP entity located in the second cell group, that in the data transmission process in the at least one cell in the first cell group, the encryption key is generated by using the security configuration parameter of the second cell group of the user equipment. However, this embodiment of the present disclosure is not limited thereto.

After receiving the first configuration indication information, the user equipment may determine, according to the first configuration indication information, a SCG intermediate key used by the first SCG, obtain an encryption key according to the SCG intermediate key and an encryption algorithm, and use the encryption key to encrypt to-be-transmitted data.

In another optional embodiment, the first configuration indication information may be further used to instruct the first SCG and the second SCG to use a same timing advance value. That is, in a data transmission process in the at least one cell in the first SCG, uplink timing adjustment is performed by using a timing advance value of the second SCG. In this case, the user equipment may perform uplink timing adjustment on the first SCG by using the timing advance value of the second SCG. The first configuration indication information may include information about a timing advance value of the second SCG or include information about a TAG to which the first SCG belongs. The first SCG and the second SCG belong to a same TAG, implicitly indicating that the first SCG and the second SCG use a same timing advance value. In this case, the network device may configure a random access resource only for one SCG of the second SCG and the first SCG, for example, configure a random access resource only for the second SCG. The user equipment may perform a random access procedure in the second SCG by using the random access resource configured by the network device, and obtain a timing advance value of the second SCG. Because the first SCG and the second SCG have a same TA value, the user equipment directly performs uplink timing adjustment in the data transmission process in the at least one cell in the first SCG by using the timing advance value of the second SCG, without performing a random access procedure in the first SCG. However, this embodiment of the present disclosure is not limited thereto.

Alternatively, the network side may configure random access resources for both the first SCG and the second SCG. In this case, when determining that the first SCG and the second SCG belong to a same TAG, the user equipment may perform a random access procedure only in the first SCG or the second SCG, instead of in both cell groups, to obtain a timing advance (TA) value corresponding to the TAG, thereby reducing system resources and reducing UE power consumption.

Therefore, according to the communication method in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Figure 6:
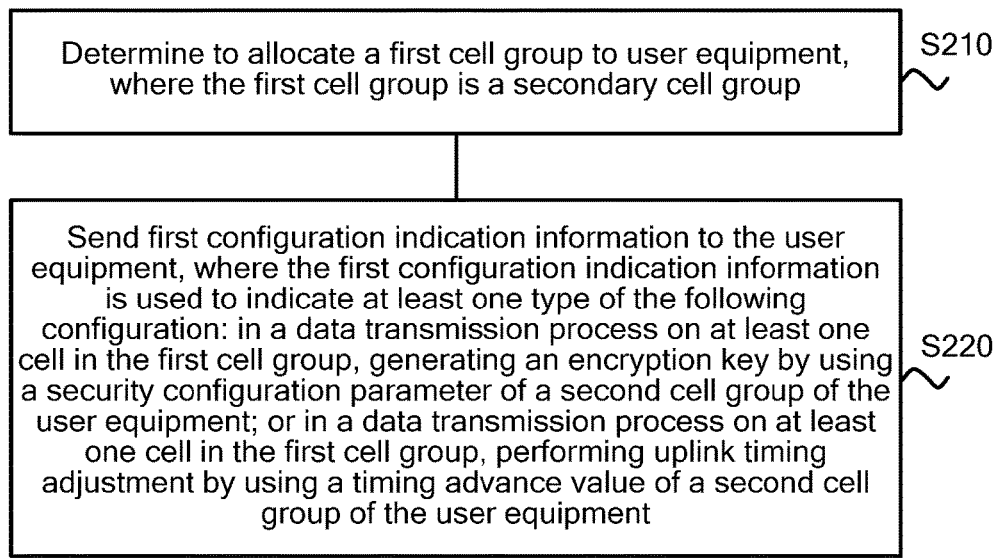
FIG. 6 is a schematic flowchart of a communication method according to another embodiment of the present disclosure.

FIG. 6 shows another communication method 200 provided by an embodiment of the present disclosure. The method 200 may be performed by a network side device such as a base station, a base station controller, or a network side server. However, this embodiment of the present disclosure is not limited thereto. As shown in FIG. 6, the method 200 includes the following steps.

S210. Determine to allocate a first cell group to user equipment, where the first cell group is a SCG.

S220. Send first configuration indication information to the user equipment, where the first configuration indication information is used to indicate at least one type of the following configuration, in a data transmission process in at least one cell in the first cell group, generating an encryption key by using a security configuration parameter of a second cell group of the user equipment, or in a data transmission process in at least one cell in the first cell group, performing uplink timing adjustment by using a timing advance value of a second cell group of the user equipment.

Therefore, according to the communication method in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

The network device may allocate the second SCG to the user equipment before allocating the first SCG to the user equipment. Alternatively, the network device may allocate the second SCG to the user equipment when allocating the first SCG to the user equipment. In this case, the first configuration indication information may be further used to indicate a configuration parameter of the second SCG that is determined by the network device. However, this embodiment of the present disclosure is not limited thereto.

The first configuration indication information may be used to indicate that the first cell group uses the security configuration parameter of the second cell group to generate the encryption key. In this case, the user equipment may perform random access procedures respectively in the first cell group and the second cell group, to obtain timing advance values respectively corresponding to the first cell group and the second cell group.

Alternatively, the first configuration indication information may be used to indicate that in the data transmission process in the at least one cell in the first cell group, uplink timing adjustment is performed by using the timing advance value of the second cell group of the user equipment. In this case, the first cell group and the second cell group share a timing advance value that is obtained by the user equipment by performing a random access procedure in the second cell group. That is, the user equipment does not need to perform a random access procedure in the first cell group. In addition, the first cell group and the second cell group may use different security configuration parameters to generate encryption keys.

Alternatively, the first configuration indication information may be used to indicate that in the data transmission process in the at least one cell in the first cell group, the encryption key is generated by using the security configuration parameter of the second cell group of the user equipment, and in the data transmission process in the at least one cell in the first cell group, uplink timing adjustment is performed by using the timing advance value of the second cell group of the user equipment. In this case, the first cell group and the second cell group share a security configuration parameter allocated by a network side to the second cell group, and the first cell group and the second cell group share a timing advance value that is obtained by the user equipment by performing a random access procedure in the second cell group. That is, the user equipment does not need to perform a random access procedure in the first cell group.

Optionally, the security configuration parameter may include at least one of the following parameters a SCG counter, a SCG intermediate key, an index value of a SCG intermediate key, or a serial number of a SCG intermediate key. Optionally, the first configuration indication information may be further used to indicate an encryption algorithm that is used when the first SCG generates the encryption key. For example, the first configuration indication information may be further used to indicate that the first cell group generates an encryption key by using an encryption algorithm of the second cell group. However, this embodiment of the present disclosure is not limited thereto.

The first cell group is a SCG, and the second cell group may be a MCG or a SCG different from the first cell group. However, this embodiment of the present disclosure is not limited thereto.

Optionally, the first cell group and the second cell group are associated with a same serving base station of the user equipment.

The user equipment may have one or more serving base stations. If the user equipment has only one serving base station, all cell groups of the user equipment are associated with the serving base station of the user equipment. If the user equipment has multiple serving base stations, and the multiple serving base stations include a MeNB and at least one SeNB, both the first cell group and the second cell group may be associated with the MeNB of the user equipment or associated with one SeNB of the user equipment. This is not limited in this embodiment of the present disclosure.

In an optional embodiment, the multiple serving base stations of the user equipment include a MeNB and at least one SeNB. The second cell group is a SCG, and the first cell group and the second cell group are both associated with a same SeNB of the user equipment.

In this case, the network device may be a SeNB associated with the first cell group and the second cell group, or may be a MeNB of the user equipment. This is not limited in this embodiment of the present disclosure.

The first configuration indication information may be further used to indicate a base station associated with the first SCG, at least one cell included in the first SCG, or a PSCell of the at least one cell included in the first SCG. This embodiment of the present disclosure is not limited thereto.

The first configuration indication information may explicitly or implicitly indicate the foregoing configuration. For example, the first configuration indication information may include identification information of the second SCG and/or identification information of a PSCell in the second SCG, to implicitly indicate that in the data transmission process in the at least one cell in the first cell group, the encryption key is generated by using the security configuration parameter of the second cell group of the user equipment, and/or in the data transmission process in the at least one cell in the first cell group, uplink timing adjustment is performed by using the timing advance value of the second cell group of the user equipment. However, this embodiment of the present disclosure is not limited thereto.

For another example, because a PDCP entity is responsible for managing the security configuration parameter, the first configuration indication information may implicitly indicate, by indicating that the data transmission on the at least one cell in the first cell group is performed by using a PDCP entity located in the second cell group, that the first cell group uses the security configuration parameter of the second cell group.

For another example, by indicating that the first cell group and the second cell group belong to a same TAG, or indicating that a PSCell in the first cell group and a PSCell or a PCell in the second cell group belong to a same TAG, the first configuration indication information may implicitly indicate that in the data transmission process in the at least one cell in the first cell group, uplink timing adjustment is performed by using the timing advance value of the second cell group of the user equipment. However, this embodiment of the present disclosure is not limited thereto.

If uplink timing adjustment is performed in the data transmission process in the first cell group by using the TA value of the second cell group, the network device may not allocate a random access resource to the first cell group, but allocates a random access resource only to the second cell group. Correspondingly, the user equipment may perform a random access procedure in the second cell group by using the random access resource, to obtain the TA value of the second cell group, and perform uplink timing adjustment in the data transmission process in the at least one cell in the first cell group by using the TA value, without performing a random access procedure in the first cell group, thereby reducing system resources and reducing power consumption of the user equipment.

In another optional embodiment, the first configuration indication information is further used to indicate that the first cell group does not have a random access resource. A random access resource is configured for the second cell group, and the timing advance value of the second cell group is obtained by the user equipment by performing a random access procedure in the second cell group by using the random access resource.

After receiving the first configuration indication information, the user equipment may determine, according to the first configuration indication information, that in the data transmission process in the at least one cell in the first cell group, an encryption key is generated by using the security configuration parameter of the second cell group, and/or in the data transmission process in the at least one cell in the first cell group, uplink timing adjustment is performed by using the timing advance value of the second cell group, establish a correspondence between the first cell group and the second cell group, and configure the first cell group according to the first configuration indication information. In another optional embodiment, the method 200 further includes receiving a configuration complete message that is sent by the user equipment according to the first configuration indication information.

In another embodiment, if the network device is a first SeNB associated with both the first cell group and the second cell group, and the user equipment has at least two serving base stations including a MeNB and the first SeNB, before S210, the method 200 further includes receiving second configuration indication information sent by the MeNB, where the second configuration indication information is used to instruct the first SeNB to allocate the first cell group to the user equipment.

Correspondingly, S210 of determining to allocate a first cell group to user equipment includes determining, according to the second configuration indication information, to allocate the first cell group to the user equipment.

The MeNB of the user equipment may instruct the first SeNB to allocate the first cell group to the user equipment. Correspondingly, the first SeNB may allocate the first cell group to the user equipment according to an instruction of the MeNB and determine a configuration parameter of the first cell group. Alternatively, the first SeNB may proactively determine to configure the first cell group associated with the first SeNB for the user equipment. However, this embodiment of the present disclosure is not limited thereto.

In another optional embodiment, the first configuration indication information may be further used to indicate at least one type of the following configuration transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

Therefore, according to the communication method in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

Figure 7:
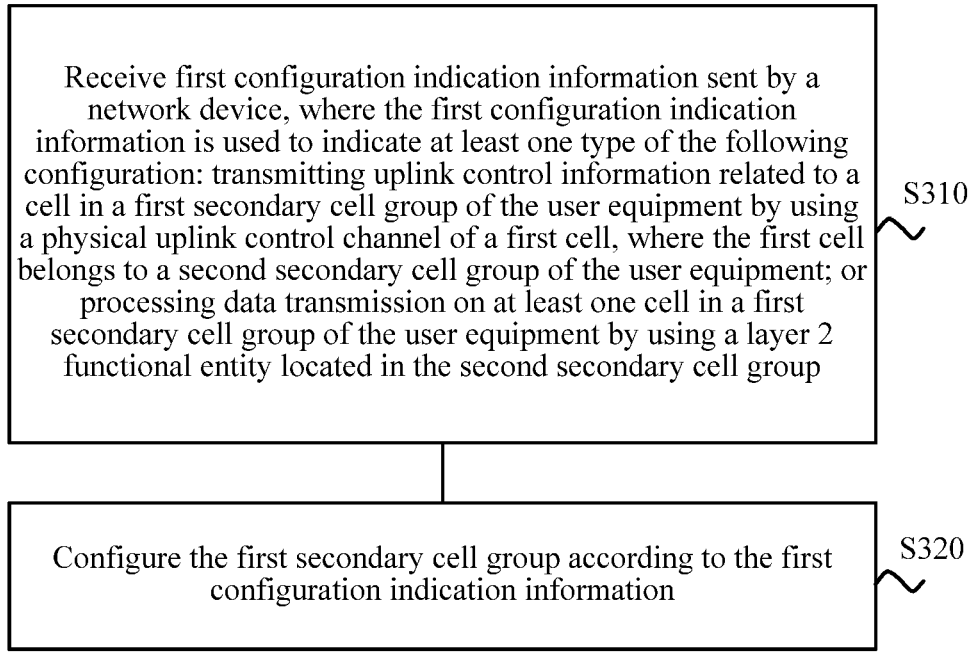
FIG. 7 is a schematic flowchart of a communication method according to another embodiment of the present disclosure.
Figure 8:
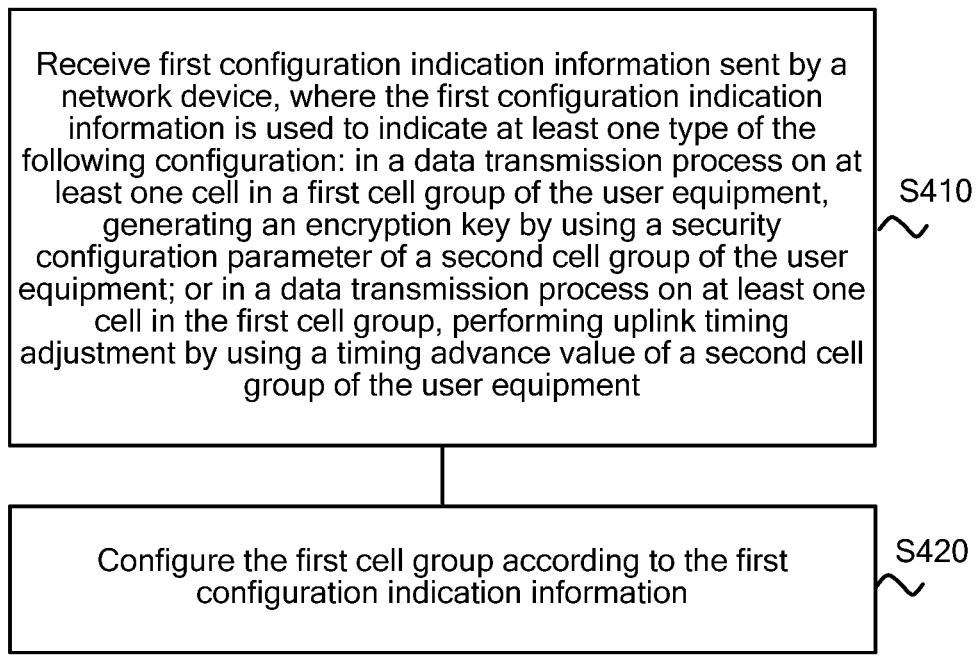
FIG. 8 is a schematic flowchart of a communication method according to another embodiment of the present disclosure.

With reference to FIG. 2 to FIG. 6, the communication methods provided by the embodiments of the present disclosure are described in detail above from a perspective of a network device. With reference to FIG. 7 and FIG. 8, communication methods provided by embodiments of the present disclosure are described in detail below from a perspective of user equipment.

FIG. 7 shows a communication method 300 provided by an embodiment of the present disclosure. The method may be performed by user equipment. As shown in FIG. 7, the method 300 includes the following steps.

S310. Receive first configuration indication information sent by a network device, where the first configuration indication information is used to indicate at least one type of the following configuration transmitting uplink control information related to a cell in a first SCG of the user equipment by using a PUCCH of a first cell, where the first cell belongs to a second SCG of the user equipment, or processing data transmission on at least one cell in a first SCG of the user equipment by using a layer 2 functional entity located in the second SCG.

S320. Configure the first SCG according to the first configuration indication information.

Therefore, according to the communication method in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

The first SCG and the second SCG may be associated with a same serving base station of the user equipment, or the first SCG and the second SCG may be associated with different serving base stations of the user equipment. For example, the first SCG is associated with a SeNB of the user equipment, and the second SCG is associated with a MeNB or another SeNB of the user equipment. This is not limited in embodiments of the present disclosure.

The first configuration indication information may be carried in a configuration message, and the configuration message may carry a configuration parameter of the first SCG that is determined by the network device. However, this embodiment of the present disclosure is not limited thereto.

In an optional embodiment, the first cell is a PSCell in the second SCG of the user equipment.

Optionally, the uplink control information includes at least one of the following information acknowledgment information ACK, negative acknowledgment information NACK, or CSI.

In another optional embodiment, a PUCCH is configured for the PSCell in the second SCG. In this case, the first configuration indication information is used to indicate transmitting an uplink control channel related to at least one cell in the first SCG by using the PUCCH configured for the PSCell in the second SCG.

In another optional embodiment, the first configuration indication information includes at least one of the following information identification information of the second SCG or identification information of the first cell.

If the first cell is not the PSCell in the second SCG, the first configuration indication information includes at least one of the following information identification information of the second SCG, identification information of the first cell, or identification information of a PSCell in the second SCG.

In this case, the configuring, by the user equipment, the first SCG according to the first configuration indication information includes determining at least one type of the following configuration according to at least one of the identification information of the second SCG of the user equipment or the identification information of the first cell transmitting the uplink control information related to the cell in the first SCG of the user equipment by using the PUCCH of the first cell, where the first cell belongs to the second SCG of the user equipment, or processing the data transmission on the at least one cell in the first SCG of the user equipment by using the layer 2 functional entity located in the second SCG.

In an embodiment, a particular field in the configuration message may carry the identification information of the second SCG, to indicate at least one type of the foregoing configuration. Alternatively, a particular field in the configuration message may carry the identification information of the PSCell in the second SCG, to indicate at least one type of the foregoing configuration. However, this embodiment of the present disclosure is not limited thereto.

In another optional embodiment, the layer 2 functional entity includes at least one of a Media Access Control entity, a Radio Link Control entity, or a Packet Data Convergence Protocol entity.

For example, the first configuration indication information may indicate processing the data transmission on the at least one cell in the first SCG by using an RLC entity and a PDCP entity that are located in the second SCG, while a MAC entity configured to process the data transmission on the at least one cell in the first SCG may be located in the first SCG. However, this embodiment of the present disclosure is not limited thereto.

In another optional embodiment, the first configuration indication information is further used to indicate establishing, in the second SCG, at least one of a Packet Data Convergence Protocol entity or a Radio Link Control entity that corresponds to a bearer of the first SCG.

Correspondingly, the processing data transmission on at least one cell in a first SCG by using a layer 2 functional entity established in the second SCG of the user equipment includes processing data transmission on the bearer of the first SCG by using at least one of the Packet Data Convergence Protocol entity or the Radio Link Control entity that is established in the second SCG and that corresponds to the bearer.

In another optional embodiment, the first configuration indication information is further used to indicate establishing a split bearer of the first SCG and the second SCG and indicate a SCG, used to perform a split operation, in the first SCG and the second SCG.

In another embodiment, the method 300 further includes sending a configuration complete message to the network device.

In another embodiment, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

Therefore, according to the communication method in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

FIG. 8 shows a communication method 400 provided by another embodiment of the present disclosure. The method 400 may be performed by user equipment. As shown in FIG. 8, the method 400 includes the following steps.

S410. Receive first configuration indication information sent by a network device, where the first configuration indication information is used to indicate at least one type of the following configuration, in a data transmission process in at least one cell in a first cell group of the user equipment, generating an encryption key by using a security configuration parameter of a second cell group of the user equipment, or in a data transmission process in at least one cell in the first cell group, performing uplink timing adjustment by using a timing advance value of a second cell group of the user equipment.

S420. Configure the first cell group according to the first configuration indication information.

Therefore, according to the communication method in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

In an optional embodiment, the first cell group and the second cell group are associated with a same serving base station of the user equipment.

In another embodiment, the second cell group is a MCG or a SCG.

Specifically, if the second cell group is a MCG, the first cell group and the second cell group may be both associated with a MeNB of the user equipment. If the second cell group is a SCG, the first cell group and the second cell group may be both associated with a MeNB or a same SeNB of the user equipment. This is not limited in this embodiment of the present disclosure.

In another embodiment, the serving base station of the user equipment includes a MeNB and at least one SeNB. In this case, the second cell group is a SCG, and the first cell group and the second cell group are both associated with the SeNB of the user equipment.

In another embodiment, the security configuration parameter includes at least one of the following a SCG counter, a SCG intermediate key, an index value of a SCG intermediate key, or a serial number of a SCG intermediate key.

In another optional embodiment, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

In this case, S420 of configuring the first cell group according to the first configuration indication information includes according to the first configuration indication information, that is, the data transmission on the at least one cell in the first cell group is processed by using the Packet Data Convergence Protocol entity located in the second cell group, which is indicated in, determining that in the data transmission process in the at least one cell in the first cell group, an encryption key is generated by using a security configuration parameter of the second cell group of the user equipment.

In another optional embodiment, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

In this case, S420 of configuring the first cell group according to the first configuration indication information includes according to the first configuration indication information, that is, the first cell group and the second cell group belong to the same TAG or the PSCell in the first cell group and the PSCell or the PCell in the second cell group belong to the same TAG, determining that in the data transmission process in the at least one cell in the first cell group, uplink timing adjustment is performed by using the timing advance value of the second cell group of the user equipment.

In another embodiment, the method 400 further includes receiving second configuration indication information sent by the network device, where the second configuration indication information is used to indicate a random access resource allocated by the network device to the second cell group, performing a random access process in the second cell group according to the second configuration indication information, to obtain a timing advance value of the second cell group, and communicating with the serving base station of the user equipment in the first cell group according to the timing advance value of the second cell group.

In another embodiment, the method 400 further includes sending a configuration complete message to the network device.

Therefore, according to the communication method in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

The communication method provided by this embodiment of the present disclosure is described in further detail below with reference to specific examples.

Figure 9:
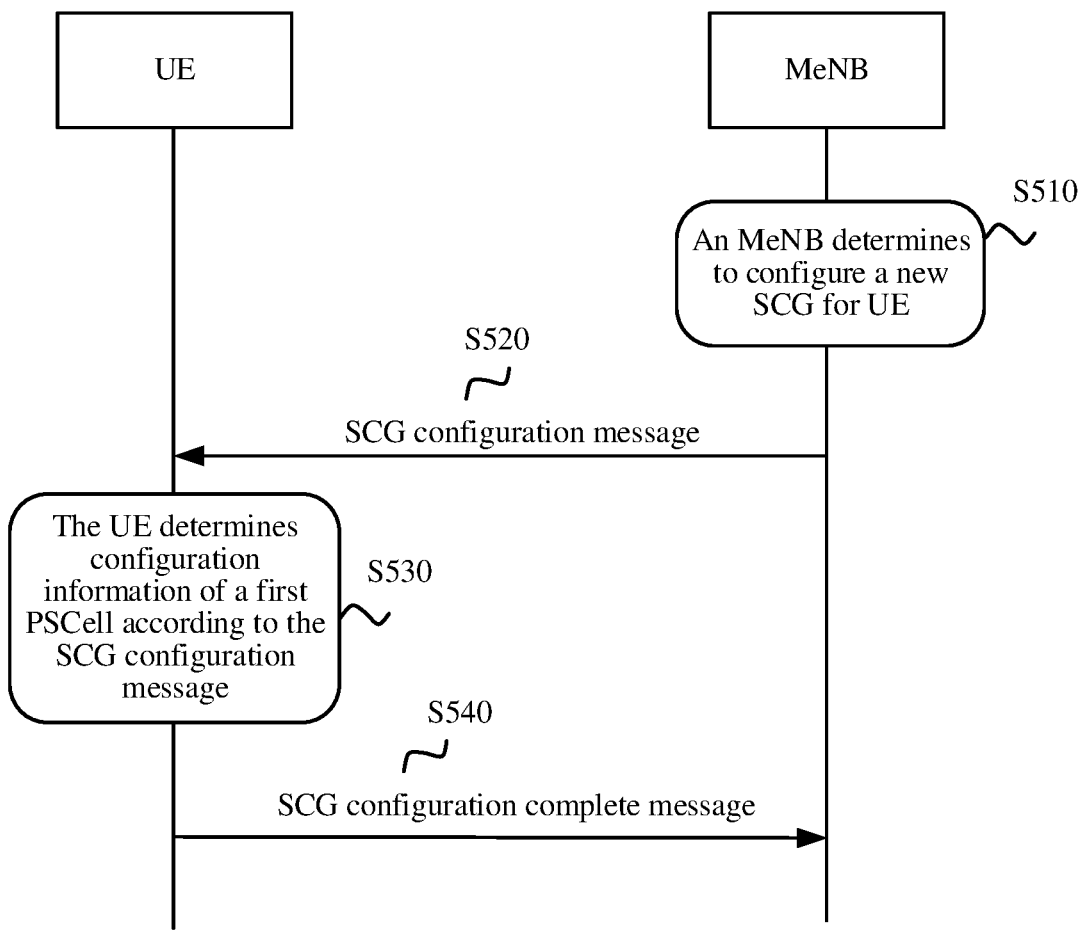
FIG. 9 is a schematic flowchart of a communication method according to another embodiment of the present disclosure.

FIG. 9 shows a communication method 500 provided by another embodiment of the present disclosure. For convenience of description, in this embodiment, it is assumed that user equipment has a MeNB and at least one SeNB, and a network device is the MeNB MeNB of the user equipment. However, this embodiment of the present disclosure is not limited thereto.

S510. The MeNB determines that a first SCG needs to be added for the UE, and determines configuration information of the first SCG. The configuration information includes configuration information of a first PSCell and configuration information of a second PSCell. The first PSCell is a PSCell of a newly configured first SCG, and no PUCCH resource is configured for the first PSCell. The second PSCell is a PSCell of a second SCG that has been configured or a PSCell of another newly added second SCG that is configured when the first SCG is configured, and a PUCCH resource is configured for the second PSCell.

S520. The MeNB sends an SCG configuration message to the UE, and configures a newly added SCG for the UE, where the SCG configuration message includes configuration information of the newly added SCG determined by the MeNB.

In an embodiment, the MeNB may add, into the SCG configuration message, indication information indicating that the first PScell and the second PScell share the PUCCH resource of the second PSCell. The indication information may be an explicit indication or an implicit indication. For example, when the first SCG is configured, identification information of the first PScell and identification information of the second PSCell are both included for implicit indication. Alternatively, the MeNB may add, into the SCG configuration message, indication information indicating that the first SCG and the second SCG share the PUCCH resource of the second SCG. The indication information may be an explicit indication or an implicit indication. For example, identification information of the first SCG and identification information of the second SCG are both included for implicit indication. Alternatively, the MeNB may instruct, in another manner, the UE to share the PUCCH resource of the first PSCell and the second PSCell or share the PUCCH resource of the first SCG and the second SCG. This embodiment of the present disclosure is not limited thereto.

S530. After receiving the SCG configuration message sent by the MeNB, the UE configures a first PSCell for the newly added SCG or further configures a second PSCell according to the SCG configuration information included in the SCG configuration message. The first PSCell belongs to the newly configured first SCG, and no PUCCH resource is configured. The second PSCell belongs to an SCG that has been configured or another new SCG that is configured when the new SCG is configured, and a PUCCH resource is configured for the second PSCell.

In an embodiment, the UE determines, according to the indication information included in the SCG configuration message, that information, such as HARQ-ACK, CSI, or an SR related to the first SCG needs to be sent in the second PSCell or the second SCG.

In other words, the UE may establish an association relationship between the first SCG or the first PSCell and the second PSCell. The association relationship indicates that the PUCCH resource of the first SCG is configured in the second PSCell, or that a feedback to the information, such as HARQ-ACK, CSI, or an SR related to the first SCG needs to be sent on a PUCCH of the second PSCell.

In this case, the first PSCell is a downlink timing reference cell of all serving cells in the newly configured first SCG. The second PSCell is a downlink timing reference cell of all serving cells in the second SCG.

S540. After configuration is completed, the UE sends an SCG configuration complete message to the MeNB.

In this way, when the UE needs to send one or more of the information, such as HARQ-ACK, CSI, or an SR related to the first SCG, the UE determines to send, by using the PUCCH resource of the second PSCell, the foregoing information.

Therefore, according to the communication method in this embodiment of the present disclosure, no PUCCH resource is configured in a first PSCell in a first SCG, and the first PSCell and a second PSCell share a PUCCH configured in the second PSCell, avoiding that power of the UE is restricted due to simultaneous PUCCH transmission performed by the UE on excessive carriers.

Figure 10:
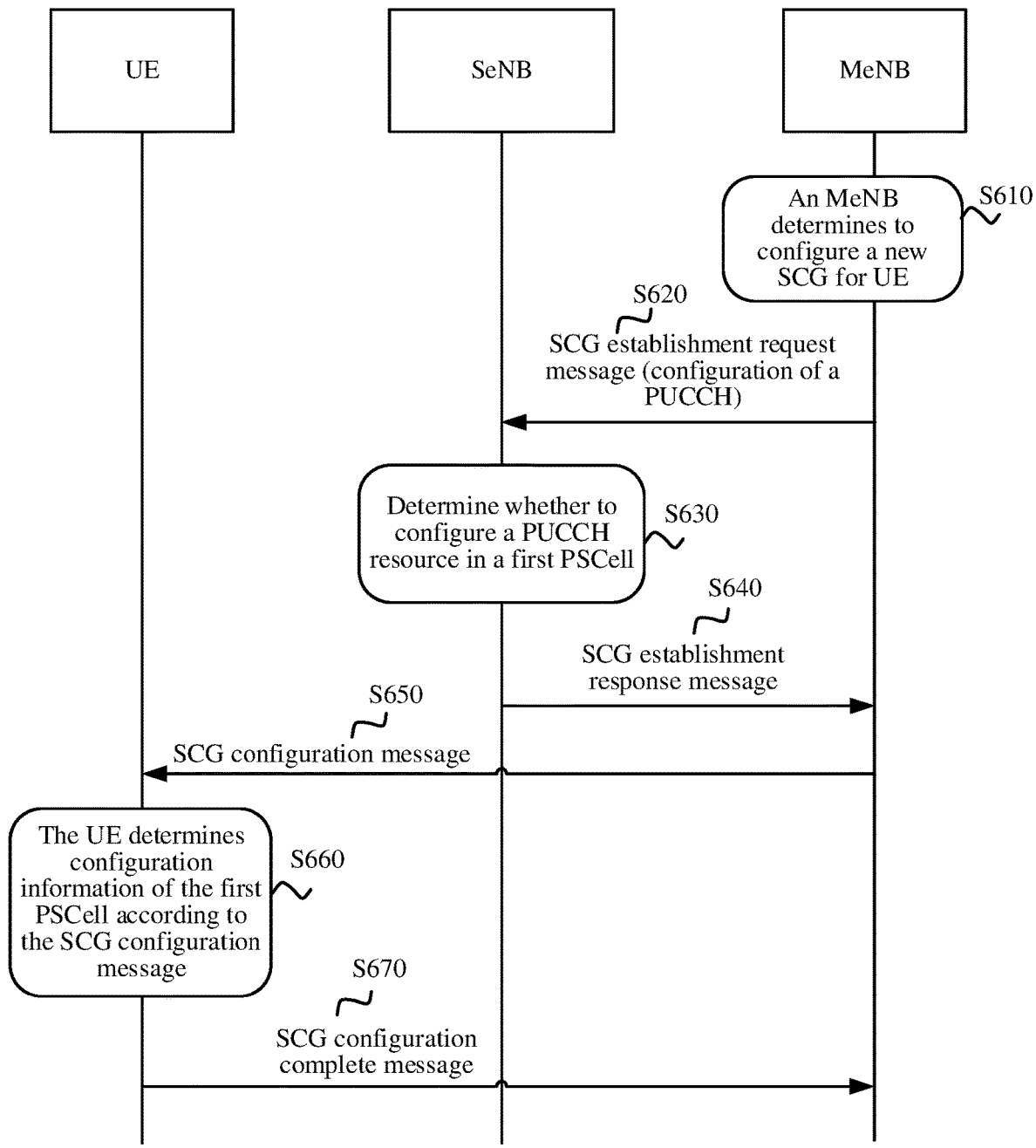
FIG. 10 is a schematic flowchart of a communication method according to another embodiment of the present disclosure.

FIG. 10 shows a communication method 600 provided by another embodiment of the present disclosure. S610 is similar to S510 and differs from S510 in that the first SCG is associated with an SeNB.

When the MeNB determines that the first SCG that needs to be added for the UE belongs to an SeNB, the MeNB may first negotiate with the SeNB to determine whether to configure a PUCCH resource in a first PSCell in the first SCG.

S620. When determining that the first SCG that needs to be added for the UE belongs to an SeNB, the MeNB sends an SCG establishment request message (or an SeNB configuration request message or an SCG addition request message) to the SeNB, where the SCG addition request message carries indication information indicating whether to configure a PUCCH resource in the SCG or whether to configure a PUCCH resource in the first PSCell. If no PUCCH resource is configured in the first SCG or in the first PSCell, the SCG addition request message indicates information about a second PSCell, and a PUCCH resource is configured for the second PSCell. The second PSCell is a PSCell of a second SCG that has been configured or a PSCell of another new second SCG that is configured when the first SCG is configured.

S630. After receiving the SCG establishment request message, the SeNB determines, according to an instruction of the MeNB, whether to configure a PUCCH resource in the first SCG or the first PSCell, or determines that information, such as HARQ-ACK, CSI, or an SR related to the first SCG, needs to be sent in the second PSCell.

S640. The SeNB sends an SCG establishment response message to the MeNB.

S650 to S670 are similar to S520 to S540 in the method 500. For brevity, details are not described herein again.

Therefore, compared with the prior-art solution of configuring a PUCCH resource for each SCG, according to the communication method in this embodiment of the present disclosure, no PUCCH resource is configured in a first PSCell in a first SCG, and the first PSCell and the second PSCell share a PUCCH configured in the second PSCell, avoiding that power on a UE side is restricted due to simultaneous PUCCH transmission performed by the UE on excessive carriers.

Figure 11:
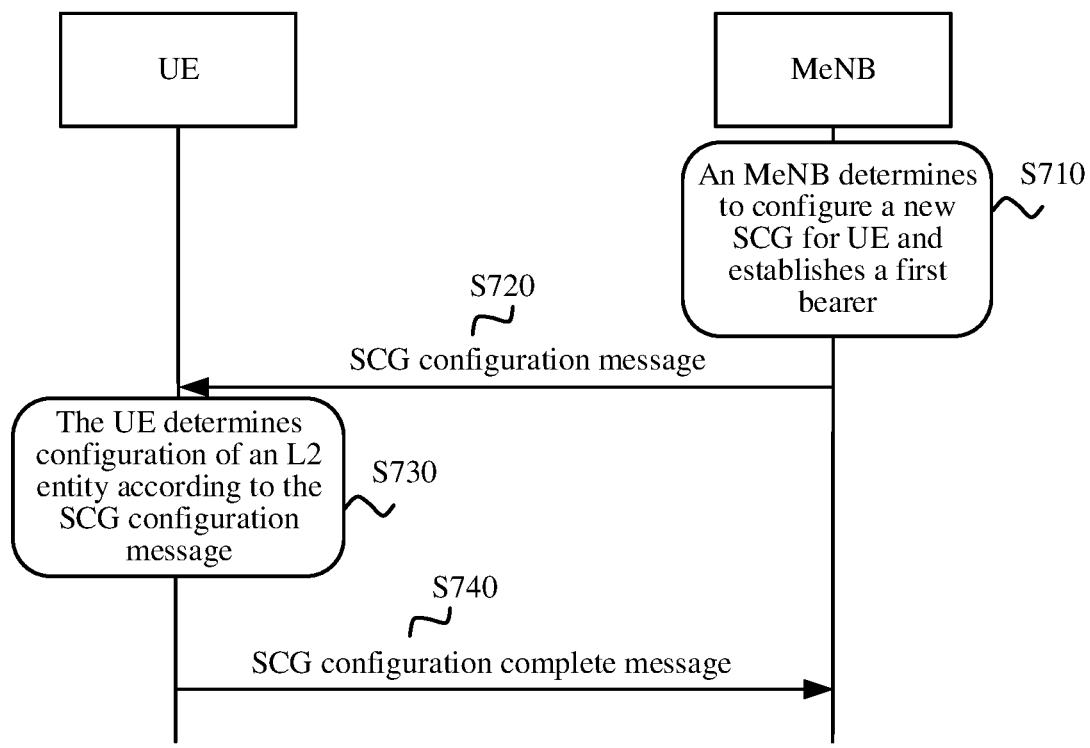
FIG. 11 is a schematic flowchart of a communication method according to another embodiment of the present disclosure.

FIG. 11 shows a communication method 700 provided by another embodiment of the present disclosure.

S710. An MeNB determines that a new first SCG needs to be configured for UE, and that a new first bearer needs to be established in the first SCG.

S720. The MeNB sends an SCG configuration message to the UE, where the SCG configuration message includes information about a bearer that needs to be established, and the SCG configuration message includes indication information indicating whether to establish a new layer 2 (L2) entity for the first SCG. The indication information may be explicit indication information or implicit indication information. The L2 entity may include a PDCP entity, an RLC entity, and a MAC entity.

If a new L2 entity needs to be established for the first SCG, whether to establish one or more of a PDCP entity, an RLC entity, or a MAC entity may be further indicated. Preferably, the MeNB may instruct the UE to establish a new MAC entity for the first SCG. The RLC entity and the PDCP entity may be shared with a second SCG.

If no new L2 entity does not need to be established for the first SCG, information about a second SCG that may share the L2 entity with the first SCG may be further indicated. The second SCG may be an SCG that has been established by the UE, or a second SCG that is newly established by the UE as instructed in the SCG configuration message.

Particularly, when the SCG configuration message instructs the UE to establish a split bearer, the SCG configuration information should further indicate an identifier of an SCG that should be established by a PDCP entity or an RLC entity of the split bearer. The split bearer indicates that a data packet of the bearer is split and transmitted in the first SCG and the second SCG. That is, a part of the data packet is transmitted by using the first SCG, and a part of the data packet is transmitted by using the second SCG. If the split bearer is split at a PDCP layer, the SCG configuration information may indicate an identifier of an SCG, that is, the first SCG or the second SCG, corresponding to the PDCP layer at which the bearer is split. Alternatively, if the split bearer is split at an RLC layer, the SCG configuration information may indicate an identifier of an SCG, that is, the first SCG or the second SCG, corresponding to the RLC layer at which the bearer is split. However, this embodiment of the present disclosure is not limited thereto.

S730. The UE determines, according to information in the SCG configuration message, whether an L2 entity of the first SCG needs to be established. Further, if the L2 entity of the first SCG needs to be established, which L2 entity of the PDCP entity, the RLC entity, and the MAC entity needs to be established may be determined. Alternatively, when an L2 entity does not need to be established, information about a second SCG that may share the L2 entity with the first SCG is determined. The second SCG is an SCG that has been established by the UE, or a second SCG that is newly established by the UE as instructed in the SCG configuration message.

For example, after receiving the SCG configuration message, the UE determines, according to indication in the SCG configuration message, that a new MAC entity needs to be established for the first SCG, and further determines that the first SCG may share a PDCP entity and an RLC entity with the second SCG.

S740. After establishing the first SCG according to the SCG configuration message and configuring an L2 entity for the first SCG, the UE sends an SCG configuration complete message to the MeNB.

Figure 12:
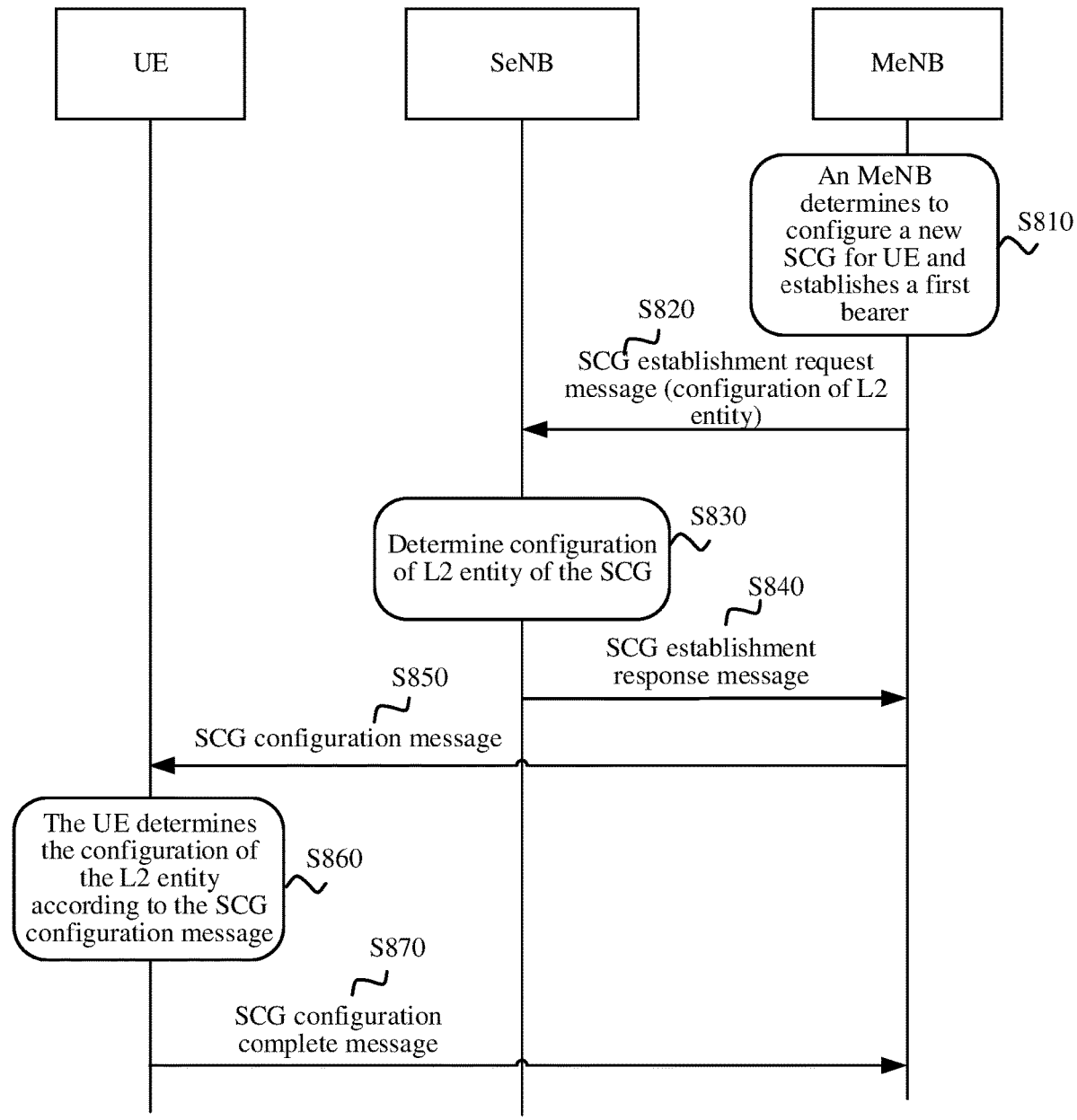
FIG. 12 is a schematic flowchart of a communication method according to another embodiment of the present disclosure.

FIG. 12 shows a communication method 800 provided by another embodiment of the present disclosure. S810 is similar to S710 and differs from S710 in that the newly added first SCG is associated with an SeNB. In this case, the MeNB may first negotiate with the SeNB to determine whether to establish a new L2 entity for the first SCG or which L2 entity is to be established.

S820. When determining that the first SCG that needs to be added for the UE belongs to an SeNB, the MeNB sends an SCG establishment request message (or an SeNB configuration request message or an SeNB addition request message, a specific name of the message is not limited in the present disclosure) to the SeNB, where the SCG establishment request message carries indication information indicating whether to establish a new L2 entity for the SCG. If it indicates that no L2 entity is established for the first SCG, information about a second SCG that may share an L2 entity with the first SCG is indicated. The second SCG is an SCG that has been established by the UE, or a second SCG that is newly established by the UE as instructed in the SCG configuration message. Alternatively, if an L2 entity needs to be established for the first SCG, that one or more of a MAC entity, an RLC entity, or a PDCP entity need to be established may be further indicated. If one or more of a MAC entity, an RLC entity, or a PDCP entity do not need to be established, information about a second SCG that may share a corresponding entity needs to be indicated.

S830. After receiving the SCG establishment request message, the SeNB determines, according to an instruction of the MeNB, whether to establish an L2 entity for the first SCG. If the indication information indicates that no new L2 entity needs to be established for the first SCG, a second SCG that should share an L2 entity with the first SCG is determined according to the indication information. If the indication information indicates some or all L2 entities of a MAC entity, an RLC entity, and a PDCP entity need to be established for the first SCG, a corresponding entity is established for the first SCG.

S840. The SeNB sends an SCG addition request acknowledgment message to the MeNB.

S850 to S870 are similar to S720 to S740. For brevity, details are not described herein again.

Therefore, compared with the prior-art technical solution of establishing an independent L2 entity for each SCG, in the communication method provided in this embodiment of the present disclosure, a first SCG and the second SCG share one or more L2 entities established in the second SCG, avoiding that complexity of UE is increased due to excessive L2 entities established on a UE side.

Figure 13:
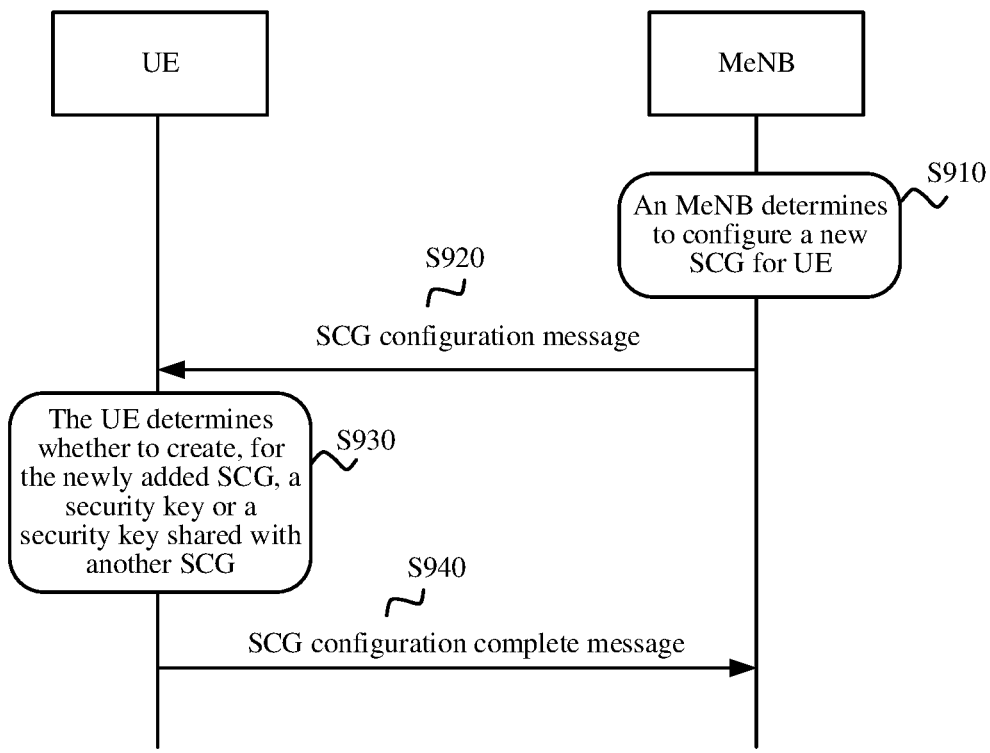
FIG. 13 is a schematic flowchart of a communication method according to another embodiment of the present disclosure.

FIG. 13 shows a communication method 900 provided by another embodiment of the present disclosure. It is assumed herein that the first SCG and the second SCG are both associated with an MeNB. If the first SCG and the second SCG are both associated with an SeNB, the MeNB in FIG. 13 may be replaced with the SeNB. This embodiment of the present disclosure is not limited thereto.

S910. The MeNB determines that a new SCG, or referred to as a first SCG herein, needs to be configured for UE.

S920. The MeNB sends an SCG configuration message to the UE, where the SCG configuration message includes indication information indicating whether to establish a new security key in the first SCG. The indication information may be explicit indication information or implicit indication information. For example, whether the UE needs to create a new security key in the first SCG is implicitly indicated by whether a security configuration parameter (an SCG counter (counter) and/or an SCG encryption algorithm) related to the first SCG is included.

If no new security key needs to be created in the first SCG, the SCG configuration message should further indicate information about a security key that should be used in the first SCG, such as an index value of the security key and a serial number of the security key. The information about the security key may be one or more of an SCG counter value, an encryption algorithm, or an intermediate key S-KeNB.

Alternatively, the SCG configuration message may instruct the first SCG and the second SCG to share a security key. The second SCG is an SCG that has been established by the UE, or a second SCG that is newly established by the UE as instructed in the SCG configuration message. The information about the shared security key may be one or more of an SCG counter value, an encryption algorithm, or an intermediate key S-KeNB of the second SCG.

Alternatively, the SCG configuration message may indicate that the first SCG should share a PDCP entity with the second SCG for the established bearer. The PDCP entity has a security key management function. Therefore, the UE may be implicitly instructed to use a security key the same as that of the second SCG when the UE performs data transmission in the first SCG.

S930. After receiving the SCG configuration message, the UE determines, according to the indication information in the SCG configuration message, whether to create a new security key in the first SCG. Alternatively, if no new security key needs to be created for the first SCG, an available security key is determined. For example, an available security key is determined according to an index of a security key in the SCG configuration message. Subsequently, when encrypting data, the UE may generate an encryption key by using the indicated security key, encrypt data that needs to be encrypted, and then transmit the data.

Alternatively, it is determined according to SCG configuration message that a security key may be shared with the second SCG. Subsequently, when performing data transmission in the first SCG, the UE generates an encryption key (Kenc) by using a security key the same as that of the second SCG, encrypts data that needs to be encrypted, and then transmits the data.

Alternatively, according to information, indicated in the SCG configuration message, that a PDCP entity is shared with the second SCG, the UE determines that the first SCG may share a security key with the second SCG. Therefore, when performing data transmission in the first SCG, the UE generates an encryption key Kenc by using a security key the same as that of the second SCG, encrypts data that needs to be encrypted, and then transmits the data.

S940. After completing configuration on the first SCG according to the SCG configuration message, the UE sends an SCG configuration complete message to the MeNB.

Therefore, according to the communication method in this embodiment of the present disclosure, a first SCG and the second SCG share a key, avoiding increasing complexity of UE due to excessive security keys managed on a UE side.

Figure 14:
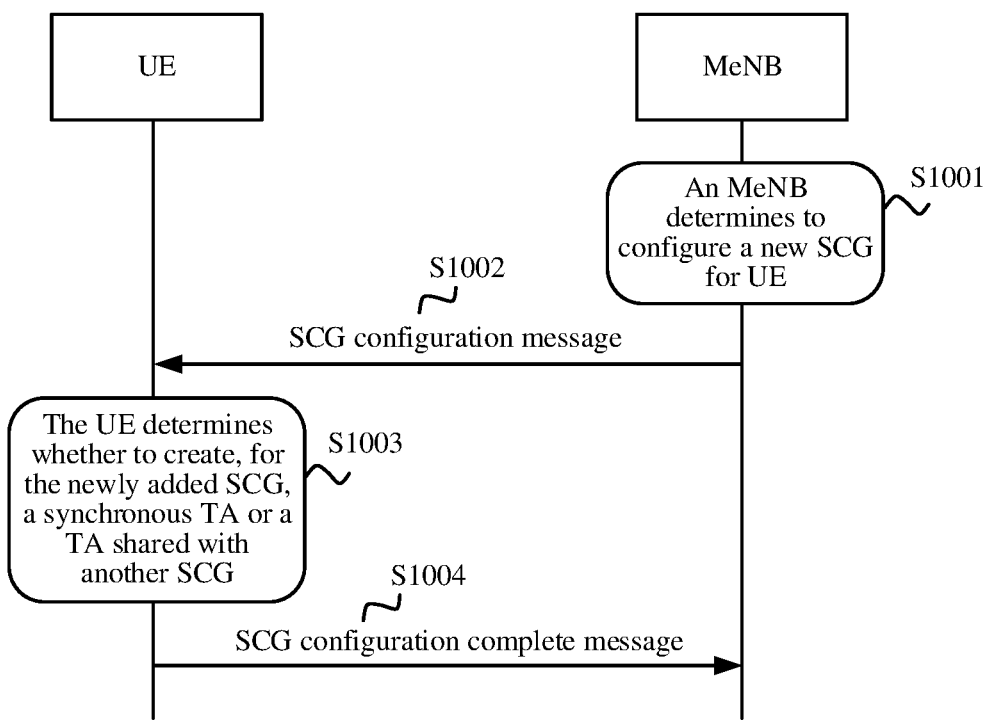
FIG. 14 is a schematic flowchart of a communication method according to another embodiment of the present disclosure.

FIG. 14 shows a communication method 1000 provided by another embodiment of the present disclosure. It is assumed herein that the first SCG and the second SCG are both associated with an MeNB. If the first SCG and the second SCG are both associated with an SeNB, the MeNB in FIG. 14 may be replaced with the SeNB. This embodiment of the present disclosure is not limited thereto.

S1001. The MeNB determines that one or more SCGs need to be configured for UE, and determines whether the one or more SCGs may belong to a same TAG. The TAG includes one or more serving cells that may share one TA value. That is, all cells in one TAG may use a same TA value.

S1002. The MeNB sends an SCG configuration message to the UE, where the SCG configuration message includes TAG information of a serving cell in the SCG, that is, information about a TAG to which the serving cell in the SCG belongs. When multiple SCGs are configured together, the SCG configuration information may include information about a PSCell of each SCG. If PSCells in the multiple SCGs that are configured together belong to the same TAG, the MeNB may configure a random access resource only for one of the PSCells.

S1003. After receiving the SCG configuration message, the UE determines information about a TAG to which a PSCell in the SCG belongs. If the TAG of the PSCell is an existing TAG, the UE skips performing random access in the PSCell, but directly performs uplink transmission by using a TA value corresponding to the TAG. Otherwise, the UE performs random access in the PSCell in the SCG to obtain a new TA value.

When multiple SCGs are added into the SCG configuration message together, the UE determines whether PSCells in the multiple SCGs belong to a same TAG. If the PSCells in the multiple SCGs belong to the same TAG, the UE selects a PSCell in one SCG to perform random access to obtain a TA value of the TAG to which the PSCell in the SCG belongs. Otherwise, if PSCells in at least two SCGs of the PSCells in the multiple SCGs do not belong to the same TAG, the UE sequentially performs random access in different PSCells. In an embodiment, a manner in which the UE chooses to preferentially perform random access in which PSCell may be making a selection in an order based on identifiers of the PSCells, and then sequentially performing random access in multiple PSCells, to obtain TA values of corresponding TAGs. Alternatively, the UE may choose, according to configuration of SCGs, a PSCell for which a random access resource has been configured to perform random access, to obtain a TA value of a corresponding TAG.

Therefore, compared with the technical solution of performing random access in each PSCell in DC, according to the communication method in this embodiment of the present disclosure, UE can be prevented from performing unnecessary random access. If multiple SCGs are configured, the UE can also be prevented from performing excessive random access, further avoiding that power of the UE is restricted due to random access performed in multiple PScells by the UE.

It should be noted that the examples in FIG. 9 and FIG. 14 are used to help a person skilled in the art better understand this embodiment of the present disclosure, rather than to limit the scope of the embodiments of the present disclosure. Apparently, a person skilled in the art may make various equivalent modifications or changes according to the examples provided in FIG. 9 and FIG. 14, and such modifications or changes also fall within the scope of the embodiments of the present disclosure.

It should be understood that sequence numbers of the foregoing processes do not mean execution sequences. The execution sequences of the processes should be determined according to functions and internal logic of the processes, and should not be construed as any limitation on the implementation processes of the embodiments of the present disclosure.

It should also be understood that the term "a PUCCH of a second SCG" may refer to "a PUCCH used by a second SCG", and may include a PUCCH allocated by a network side to the second SCG as described above, or may include a PUCCH shared by another cell group with the second SCG. For example, the network side allocates a same PUCCH to the second SCG and the another cell group. This is not limited in the embodiments of the present disclosure.

It should also be understood that the term "a layer 2 functional entity of a second SCG" may refer to "a layer 2 functional entity established in a second SCG", and may include a layer 2 functional entity that is established by user equipment in the second SCG and that corresponds to the second SCG as described above. This is not limited in the embodiments of the present disclosure.

It should also be understood that the term "a security configuration parameter of a second cell group" may refer to "a security configuration parameter used by a second cell group", and may include a security configuration parameter particularly allocated by a network side to the second cell group for user equipment as described above, or may include a security configuration parameter shared by another cell group with the second cell group. For example, the network side allocates a same security configuration parameter to the another cell group and the second cell group, or the network side allocate a security configuration parameter to the another cell group. This is not limited in the embodiments of the present disclosure.

It should also be understood that the term "a timing advance value of a second cell group" may refer to "a timing advance value used by a second cell group", and may include a timing advance value obtained by user equipment by performing a random access procedure in the second cell group, or may include a timing advance value obtained by the user equipment in another cell group, and the second cell group shares the timing advance value with the another cell group. This is not limited in the embodiments of the present disclosure.

With reference to FIG. 2 to FIG. 14, the communication methods provided by the embodiments of the present disclosure are described in detail above. With reference to FIG. 15 to FIG. 22, a network device, user equipment, and a communications system according to embodiments of the present disclosure are described below.

Figure 15:
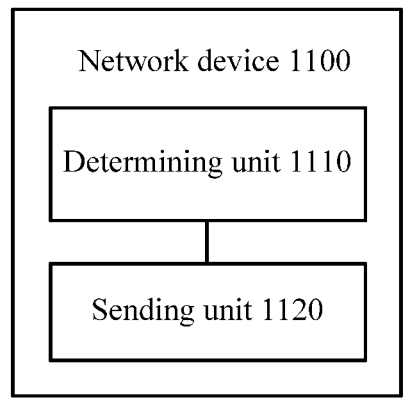
FIG. 15 is a schematic block diagram of a network device according to an embodiment of the present disclosure.

FIG. 15 shows a network device 1100 provided by an embodiment of the present disclosure. The network device may be a base station, a base station controller, or another network side device. This is not limited in this embodiment of the present disclosure. As shown in FIG. 15, the network device 1100 includes a determining unit 1110 configured to determine to allocate a first SCG to user equipment, and a sending unit 1120 configured to send first configuration indication information to the user equipment, where the first configuration indication information is used to indicate at least one type of the following configuration of the allocated first SCG determined by the determining unit 1110 transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

Therefore, according to the network device in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Optionally, the first cell is a PSCell in second SCG of the user equipment.

The uplink control information includes at least one of the following information acknowledgment information ACK, negative acknowledgment information NACK, or CSI.

In another optional embodiment, the first configuration indication information includes at least one of the following information identification information of the second SCG of the user equipment or identification information of the first cell.

In another optional embodiment, the layer 2 functional entity includes at least one of a Media Access Control entity, a Radio Link Control entity, or a Packet Data Convergence Protocol entity.

In another optional embodiment, the first configuration indication information is further used to indicate establishing, in the second SCG of the user equipment, at least one of a Packet Data Convergence Protocol entity or a Radio Link Control entity that corresponds to a bearer of the first SCG.

Correspondingly, the processing data transmission on at least one cell in the first SCG by using a layer 2 functional entity located in the second SCG includes processing data transmission on the bearer of the first SCG by using at least one of the Packet Data Convergence Protocol entity or the Radio Link Control entity that is established in the second SCG and that corresponds to the bearer.

In another optional embodiment, the first configuration indication information is further used to indicate establishing a split bearer of the first SCG and the second SCG and indicate a SCG, used to perform a split operation, in the first SCG and the second SCG.

In another optional embodiment, the network device is a MeNB, the user equipment has at least two serving base stations including the MeNB and a first SeNB, and the first SCG is associated with the first SeNB. In this case, the sending unit is further configured to, before sending the first configuration indication information to the user equipment, send second configuration indication information to the first SeNB, where the second configuration indication information is used to indicate a configuration parameter of the first SCG that is determined by the MeNB, and the configuration parameter includes at least one of a PUCCH of the cell in the first SCG or a layer 2 functional entity corresponding to the data transmission on the at least one cell in the first SCG.

Correspondingly, the MeNB further includes a second receiving unit configured to receive a configuration response message that is sent by the first SeNB according to the second configuration indication information sent by the sending unit, and the sending unit is further configured to send the first configuration indication information to the user equipment according to the configuration response message received by the second receiving unit.

In another optional embodiment, all cell groups configured for the user equipment are associated with a same serving base station of the user equipment.

In another optional embodiment, the user equipment has multiple serving base stations, and the first SCG and the second SCG are associated with different base stations.

In another optional embodiment, the configuration response message is used to indicate a configuration parameter of the first SCG that is determined by the first SeNB according to the second configuration indication information.

Correspondingly, the sending unit includes a determining subunit configured to determine at least one type of the following configuration according to the configuration response message received by the second receiving unit transmitting the uplink control information of the cell in the first SCG by using the PUCCH of the first cell, or processing the data transmission on the at least one cell in the first SCG by using the layer 2 functional entity located in the second SCG.

In another optional embodiment, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

The network device 1100 according to this embodiment of the present disclosure may correspond to the network device in the communication methods according to the embodiments of the present disclosure, and the foregoing and other operations and/or functions of the modules in the network device 1100 respectively implement corresponding procedures of the methods in FIG. 2 and FIG. 9 to FIG. 14. For brevity, details are not described herein again.

Therefore, according to the network device in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Figure 16:
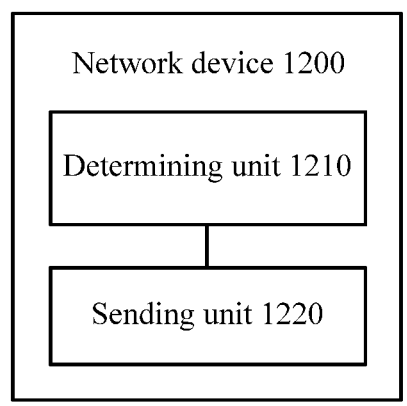
FIG. 16 is a schematic block diagram of a network device according to another embodiment of the present disclosure.

FIG. 16 shows a network device 1200 provided by another embodiment of the present disclosure. The network device 1200 may be a base station, a base station controller, or another network side device. As shown in FIG. 16, the network device 1200 includes a determining unit 1210 configured to determine to allocate a first cell group to user equipment, where the first cell group is a SCG, and a sending unit 1220 configured to send first configuration indication information to the user equipment, where the first configuration indication information is used to indicate at least one type of the following configuration of the allocated first cell group determined by the determining unit 1210, in a data transmission process in at least one cell in the first cell group, generating an encryption key by using a security configuration parameter of a second cell group of the user equipment, or in a data transmission process in at least one cell in the first cell group, performing uplink timing adjustment by using a timing advance value of a second cell group of the user equipment.

Therefore, according to the network device in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

Optionally, the first cell group and the second cell group are associated with a same serving base station of the user equipment.

Optionally, the second cell group is a MCG or a SCG.

In an optional embodiment, the serving base stations of the user equipment include a MeNB and at least one SeNB.

The second cell group is a SCG, and the first cell group and the second cell group are both associated with a same SeNB of the user equipment.

In another optional embodiment, the security configuration parameter includes at least one of the following parameters a SCG counter, a SCG intermediate key, an index value of a SCG intermediate key, or a serial number of a SCG intermediate key.

In another optional embodiment, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

In another optional embodiment, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

In another optional embodiment, the first configuration indication information is further used to indicate that the first cell group does not have a random access resource. A random access resource is configured for the second cell group, and the timing advance value of the second cell group is obtained by the user equipment by performing a random access procedure in the second cell group by using the random access resource.

In another optional embodiment, the network device 1200 further includes a first receiving unit configured to receive a configuration complete message that is sent by the user equipment according to the first configuration indication information.

In another optional embodiment, the network device is a first SeNB associated with both the first cell group and the second cell group, and the user equipment has at least two serving base stations including a MeNB and the first SeNB.

Correspondingly, the first SeNB further includes a second receiving unit configured to, before the sending unit sends the first configuration indication information to the user equipment, receive second configuration indication information sent by the MeNB, where the second configuration indication information is used to instruct the first SeNB to allocate the first cell group to the user equipment, and the determining unit is further configured to determine, according to the second configuration indication information received by the second receiving unit, to allocate the first cell group to the user equipment.

The network device 1200 according to this embodiment of the present disclosure may correspond to the network device in the communication methods according to the embodiments of the present disclosure, and the foregoing and other operations and/or functions of the modules in the network device 1200 respectively implement corresponding procedures of the methods in FIG. 6 and FIG. 9 to FIG. 14. For brevity, details are not described herein again.

Therefore, according to the network device in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

Figure 17:
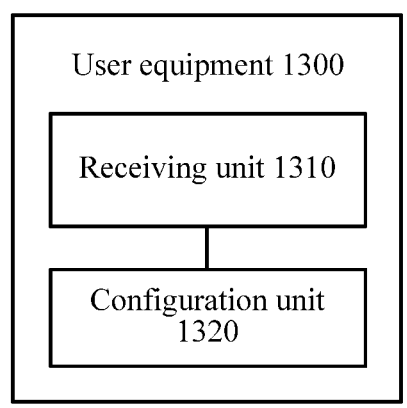
FIG. 17 is a schematic block diagram of user equipment according to an embodiment of the present disclosure.

FIG. 17 shows user equipment 1300 provided by an embodiment of the present disclosure. The user equipment 1300 includes a receiving unit 1310 configured to receive first configuration indication information sent by a network device, where the first configuration indication information is used to indicate at least one type of the following configuration transmitting uplink control information related to a cell in a first SCG of the user equipment by using a PUCCH of a first cell, where the first cell belongs to a second SCG of the user equipment, or processing data transmission on at least one cell in a first SCG of the user equipment by using a layer 2 functional entity located in the second SCG, and a configuration unit 1320 configured to configure the first SCG according to the first configuration indication information received by the receiving unit 1310.

Therefore, according to the user equipment in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Optionally, the first cell is a PSCell in second SCG of the user equipment.

The uplink control information includes at least one of the following information acknowledgment information ACK, negative acknowledgment information NACK, or CSI.

Optionally, the first configuration indication information includes at least one of the following information identification information of the second SCG of the user equipment or identification information of the first cell.

In another optional embodiment, a PUCCH is configured for a PSCell in the second SCG. The first configuration indication information is used to indicate performing the data transmission on the at least one cell in the first SCG by using the PUCCH configured for the PSCell in the second SCG.

In another optional embodiment, the layer 2 functional entity includes at least one of a Media Access Control entity, a Radio Link Control entity, or a Packet Data Convergence Protocol entity.

In another optional embodiment, the first configuration indication information is further used to indicate establishing, in the second SCG, at least one of a Packet Data Convergence Protocol entity or a Radio Link Control entity that corresponds to a bearer of the first SCG.

The processing data transmission on at least one cell in a first SCG by using a layer 2 functional entity established in the second SCG of the user equipment includes processing data transmission on the bearer of the first SCG by using at least one of the Packet Data Convergence Protocol entity or the Radio Link Control entity that is established in the second SCG and that corresponds to the bearer.

In another optional embodiment, the first configuration indication information is further used to indicate establishing a split bearer of the first SCG and the second SCG and indicate a SCG, used to perform a split operation, in the first SCG and the second SCG.

In another optional embodiment, the user equipment 1300 further includes a sending unit configured to send a configuration complete message to the network device.

In another optional embodiment, all cell groups configured for the user equipment are associated with a same base station of the user equipment.

In another optional embodiment, the user equipment has multiple serving base stations, and the first SCG and the second SCG are associated with different base stations.

In another optional embodiment, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

The user equipment 1300 according to this embodiment of the present disclosure may correspond to the network device in the communication methods according to the embodiments of the present disclosure, and the foregoing and other operations and/or functions of the modules in the user equipment 1300 respectively implement corresponding procedures of the methods in FIG. 7 and FIG. 9 to FIG. 14. For brevity, details are not described herein again.

Therefore, according to the user equipment in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Figure 18:
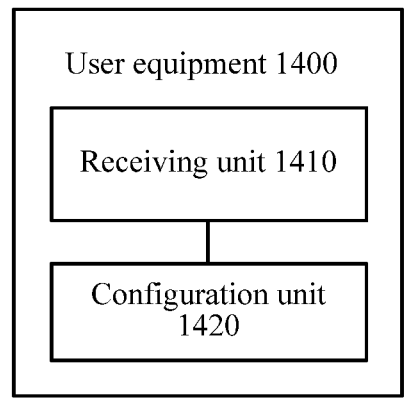
FIG. 18 is a schematic block diagram of user equipment according to another embodiment of the present disclosure.

FIG. 18 shows user equipment 1400 provided by another embodiment of the present disclosure. The user equipment 1400 includes a receiving unit 1410 configured to receive first configuration indication information sent by a network device, where the first configuration indication information is used to indicate at least one type of the following configuration, in a data transmission process in at least one cell in a first cell group of the user equipment, generating an encryption key by using a security configuration parameter of a second cell group of the user equipment, or in a data transmission process in at least one cell in the first cell group, performing uplink timing adjustment by using a timing advance value of a second cell group of the user equipment, and a configuration unit 1420 configured to configure the first cell group according to the first configuration indication information received by the receiving unit 1410.

Therefore, according to user equipment in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

Optionally, the first cell group and the second cell group are associated with a same serving base station of the user equipment.

In another optional embodiment, the second cell group is a MCG or a SCG.

In another optional embodiment, serving base stations of the user equipment include a MeNB and at least one SeNB. The second cell group is a SCG, and the first cell group and the second cell group are both associated with a SeNB of the user equipment.

In another optional embodiment, the security configuration parameter includes at least one of the following parameters a SCG counter, a SCG intermediate key, an index value of a SCG intermediate key, or a serial number of a SCG intermediate key.

In another optional embodiment, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

In this case, the configuration unit 1420 is further configured to, according to that the data transmission on the at least one cell in the first cell group is processed by using the Packet Data Convergence Protocol entity located in the second cell group, which is indicated in the first configuration indication information, determine to generate, in the data transmission process in the at least one cell in the first cell group, an encryption key by using a security configuration parameter of the second cell group of the user equipment.

In another optional embodiment, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

In this case, the configuration unit 1420 is further configured to, according to that the first cell group and the second cell group belong to the same TAG or the PSCell in the first cell group and the PSCell or the PCell in the second cell group belong to the same TAG, which is indicated in the first configuration indication information, determine to perform, in the data transmission process in the at least one cell in the first cell group, uplink timing adjustment by using the timing advance value of the second cell group of the user equipment.

In another optional embodiment, the receiving unit 1410 is further configured to receive second configuration indication information sent by the network device, where the second configuration indication information is used to indicate a random access resource allocated by the network device to the second cell group.

Correspondingly, the user equipment 1400 further includes a random access unit configured to perform a random access process in the second cell group according to the second configuration indication information received by the receiving unit 1410, to obtain a timing advance value of the second cell group, and a communications unit configured to communicate with the serving base station of the user equipment in the first cell group according to the timing advance value of the second cell group that is obtained by the random access unit.

In another optional embodiment, the user equipment 1400 further includes a sending unit configured to send a configuration complete message to the network device.

The user equipment 1400 according to this embodiment of the present disclosure may correspond to the user equipment in the communication methods according to the embodiments of the present disclosure, and the foregoing and other operations and/or functions of the modules in the user equipment 1400 respectively implement corresponding procedures of the methods in FIG. 8 to FIG. 14. For brevity, details are not described herein again.

Therefore, according to the user equipment in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

Figure 19:
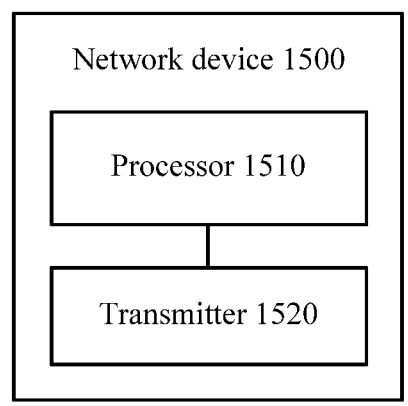
FIG. 19 is a schematic block diagram of a network device according to another embodiment of the present disclosure.

FIG. 19 shows a network device 1500 provided by an embodiment of the present disclosure. The network device may be a base station, a base station controller, or another network side device. This is not limited in this embodiment of the present disclosure. As shown in FIG. 19, the network device 1500 includes a processor 1510 configured to determine to allocate a first SCG to user equipment, and a transmitter 1520 configured to send first configuration indication information to the user equipment, where the first configuration indication information is used to indicate at least one type of the following configuration of the allocated first SCG determined by the processor 1510 transmitting uplink control information related to a cell in the first SCG by using a PUCCH of a first cell, where the first cell belongs to a second SCG of the user equipment, or processing data transmission on at least one cell in the first SCG by using a layer 2 functional entity located in the second SCG.

Therefore, according to the network device in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

It should be understood that in this embodiment of the present disclosure, the processor 1510 may be a central processing unit (CPU), or the processor 1510 may be another general purpose processor, a digital signal processor (DSP), an application-specific integrated circuit (ASIC), a field-programmable gate array (FPGA), or another programmable logic device, discrete gate or transistor logic device, or discrete hardware component. The general purpose processor may be a microprocessor or the processor may be any conventional processor or the like.

The network device may further include a memory. The memory may include a read-only memory and a random access memory and provide an instruction and data to the processor 1510. A part of the memory may further include a non-volatile random access memory. For example, the memory may further store device type information.

The network device may further include a bus system. In addition to including a data bus, the bus system may further include a power bus, a control bus, a state signal bus, and the like. However, for clear description, all buses are marked as the bus system in the figure.

In an implementation process, steps of the foregoing methods may be accomplished by using an integrated logic circuit of hardware in the processor 1510 or an instruction in a form of software. The steps of the method that are disclosed in the embodiments of the present disclosure may be directly performed and completed by a hardware processor or performed and completed by a combination of hardware and software modules in the processor. The software module may be located in a mature storage medium in the art, such as a random access memory, a flash memory, a read-only memory, a programmable read-only memory, an electric erasable programmable memory, or a register. The storage medium is located in the memory, and the processor 1510 reads information in the memory and completes the steps in the foregoing methods in combination with hardware of the processor 1510. To avoid repetition, details are not described herein again.

Optionally, the first cell is a PSCell in second SCG of the user equipment.

The uplink control information includes at least one of the following information acknowledgment information ACK, negative acknowledgment information NACK, or CSI.

In another optional embodiment, the first configuration indication information includes at least one of the following information identification information of the second SCG of the user equipment or identification information of the first cell.

In another optional embodiment, the layer 2 functional entity includes at least one of a Media Access Control entity, a Radio Link Control entity, or a Packet Data Convergence Protocol entity.

In another optional embodiment, the first configuration indication information is further used to indicate establishing, in the second SCG of the user equipment, at least one of a Packet Data Convergence Protocol entity or a Radio Link Control entity that corresponds to a bearer of the first SCG.

Correspondingly, the processing data transmission on at least one cell in the first SCG by using a layer 2 functional entity located in the second SCG includes processing data transmission on the bearer of the first SCG by using at least one of the Packet Data Convergence Protocol entity or the Radio Link Control entity that is established in the second SCG and that corresponds to the bearer.

In another optional embodiment, the first configuration indication information is further used to indicate establishing a split bearer of the first SCG and the second SCG and indicate a SCG, used to perform a split operation, in the first SCG and the second SCG.

In another optional embodiment, the network device is a MeNB, the user equipment has at least two serving base stations including the MeNB and a first SeNB, and the first SCG is associated with the first SeNB. In this case, the transmitter is further configured to, before sending the first configuration indication information to the user equipment, send second configuration indication information to the first SeNB, where the second configuration indication information is used to indicate a configuration parameter of the first SCG that is determined by the MeNB, and the configuration parameter includes at least one of a PUCCH of the cell in the first SCG or a layer 2 functional entity corresponding to the data transmission on the at least one cell in the first SCG.

Correspondingly, the MeNB further includes a second receiver configured to receive a configuration response message that is sent by the first SeNB according to the second configuration indication information sent by the transmitter, and the transmitter is further configured to send the first configuration indication information to the user equipment according to the configuration response message received by the second receiver.

In another optional embodiment, all cell groups configured for the user equipment are associated with a same serving base station of the user equipment.

In another optional embodiment, the user equipment has multiple serving base stations, and the first SCG and the second SCG are associated with different base stations.

In another optional embodiment, the configuration response message is used to indicate a configuration parameter of the first SCG that is determined by the first SeNB according to the second configuration indication information.

Correspondingly, the processor is further configured to determine at least one type of the following configuration according to the configuration response message received by the receiver transmitting the uplink control information of the cell in the first SCG by using the PUCCH of the first cell, or processing the data transmission on the at least one cell in the first SCG by using the layer 2 functional entity located in the second SCG.

In another optional embodiment, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

The network device 1500 according to this embodiment of the present disclosure may correspond to the network device in the communication methods according to the embodiments of the present disclosure, and the foregoing and other operations and/or functions of the modules in the network device 1500 respectively implement corresponding procedures of the methods in FIG. 2 and FIG. 9 to FIG. 14. For brevity, details are not described herein again.

Therefore, according to the network device in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Figure 20:
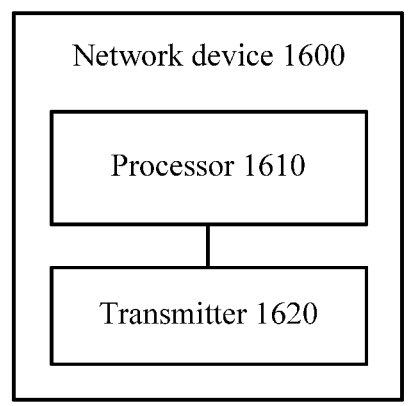
FIG. 20 is a schematic block diagram of a network device according to another embodiment of the present disclosure.

FIG. 20 shows a network device 1600 provided by another embodiment of the present disclosure. The network device may 1600 be a base station, a base station controller, or another network side device. As shown in FIG. 20, the network device 1600 includes a processor 1610 configured to determine to allocate a first cell group to user equipment, where the first cell group is a SCG, and a transmitter 1620 configured to send first configuration indication information to the user equipment, where the first configuration indication information is used to instruct the processor 1610 to determine at least one type of the following configuration of the allocated first cell group, in a data transmission process in at least one cell in the first cell group, generating an encryption key by using a security configuration parameter of a second cell group of the user equipment, or in a data transmission process in at least one cell in the first cell group, performing uplink timing adjustment by using a timing advance value of a second cell group of the user equipment.

Therefore, according to the network device in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

It should be understood that in this embodiment of the present disclosure, the processor 1610 may be a central processing unit (CPU), or the processor 1610 may be another general purpose processor, a digital signal processor (DSP), an application-specific integrated circuit (ASIC), a field-programmable gate array (FPGA), or another programmable logic device, discrete gate or transistor logic device, or discrete hardware component. The general purpose processor may be a microprocessor or the processor may be any conventional processor or the like.

The network device may further include a memory. The memory may include a read-only memory and a random access memory and provide an instruction and data to the processor 1610. A part of the memory may further include a non-volatile random access memory. For example, the memory may further store device type information.

The network device may further include a bus system. In addition to including a data bus, the bus system may further include a power bus, a control bus, a state signal bus, and the like. However, for clear description, all buses are marked as the bus system in the figure.

In an implementation process, steps of the foregoing methods may be accomplished by using an integrated logic circuit of hardware in the processor 1610 or an instruction in a form of software. The steps of the method that are disclosed in the embodiments of the present disclosure may be directly performed and completed by a hardware processor or performed and completed by a combination of hardware and software modules in the processor. The software module may be located in a mature storage medium in the art, such as a random access memory, a flash memory, a read-only memory, a programmable read-only memory, an electric erasable programmable memory, or a register. The storage medium is located in the memory, and the processor 1610 reads information in the memory and completes the steps in the foregoing methods in combination with hardware of the processor 1610. To avoid repetition, details are not described herein again.

Optionally, the first cell group and the second cell group are associated with a same serving base station of the user equipment.

Optionally, the second cell group is a MCG or a SCG.

In an optional embodiment, the serving base stations of the user equipment include a MeNB and at least one SeNB. The second cell group is a SCG, and the first cell group and the second cell group are both associated with a same SeNB of the user equipment.

In another optional embodiment, the security configuration parameter includes at least one of the following parameters a SCG counter, a SCG intermediate key, an index value of a SCG intermediate key, or a serial number of a SCG intermediate key.

In another optional embodiment, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

In another optional embodiment, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

In another optional embodiment, the first configuration indication information is further used to indicate that the first cell group does not have a random access resource. A random access resource is configured for the second cell group, and the timing advance value of the second cell group is obtained by the user equipment by performing a random access procedure in the second cell group by using the random access resource.

In another optional embodiment, the network device 1600 further includes a receiver configured to receive a configuration complete message that is sent by the user equipment according to the first configuration indication information.

In another optional embodiment, the network device is a first SeNB associated with both the first cell group and the second cell group, and the user equipment has at least two serving base stations including a MeNB and the first SeNB. In this case, the first SeNB further includes a receiver configured to, before the transmitter sends the first configuration indication information to the user equipment, receive second configuration indication information sent by the MeNB, where the second configuration indication information is used to instruct the first SeNB to allocate the first cell group to the user equipment, and correspondingly, the processor is further configured to determine, according to the second configuration indication information received by the receiver, to allocate the first cell group to the user equipment.

The network device 1600 according to this embodiment of the present disclosure may correspond to the network device in the communication methods according to the embodiments of the present disclosure, and the foregoing and other operations and/or functions of the modules in the network device 1600 respectively implement corresponding procedures of the methods in FIG. 6 and FIG. 9 to FIG. 14. For brevity, details are not described herein again.

Therefore, according to the network device in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

Figure 21:
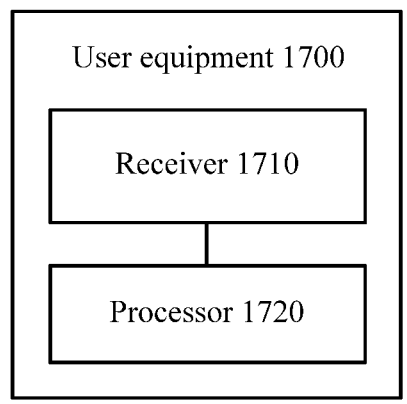
FIG. 21 is a schematic block diagram of user equipment according to another embodiment of the present disclosure.

FIG. 21 shows user equipment 1700 provided by an embodiment of the present disclosure. The user equipment 1700 includes a receiver 1710 configured to receive first configuration indication information sent by a network device, where the first configuration indication information is used to indicate at least one type of the following configuration transmitting uplink control information related to a cell in a first SCG of the user equipment by using a PUCCH of a first cell, where the first cell belongs to a second SCG of the user equipment, or processing data transmission on at least one cell in a first SCG of the user equipment by using a layer 2 functional entity located in the second SCG, and a processor 1720 configured to configure the first SCG according to the first configuration indication information received by the receiver 1710.

Therefore, according to the user equipment in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

It should be understood that in this embodiment of the present disclosure, the processor 1720 may be a central processing unit (CPU), or the processor 1720 may be another general purpose processor, a digital signal processor (DSP), an application-specific integrated circuit (ASIC), a field-programmable gate array (FPGA), or another programmable logic device, discrete gate or transistor logic device, or discrete hardware component. The general purpose processor may be a microprocessor or the processor may be any conventional processor or the like.

The network device may further include a memory. The memory may include a read-only memory and a random access memory and provide an instruction and data to the processor 1720. A part of the memory may further include a non-volatile random access memory. For example, the memory may further store device type information.

The network device may further include a bus system. In addition to including a data bus, the bus system may further include a power bus, a control bus, a state signal bus, and the like. However, for clear description, all buses are marked as the bus system in the figure.

In an implementation process, steps of the foregoing methods may be accomplished by using an integrated logic circuit of hardware in the processor 1720 or an instruction in a form of software. The steps of the method that are disclosed in the embodiments of the present disclosure may be directly performed and completed by a hardware processor or performed and completed by a combination of hardware and software modules in the processor. The software module may be located in a mature storage medium in the art, such as a random access memory, a flash memory, a read-only memory, a programmable read-only memory, an electric erasable programmable memory, or a register. The storage medium is located in the memory, and the processor 1720 reads information in the memory and completes the steps in the foregoing methods in combination with hardware of the processor 1720. To avoid repetition, details are not described herein again.

Optionally, the first cell is a PSCell in second SCG of the user equipment.

The uplink control information includes at least one of the following information acknowledgment information ACK, negative acknowledgment information NACK, or CSI.

Optionally, the first configuration indication information includes at least one of the following information identification information of the second SCG of the user equipment or identification information of the first cell.

In another optional embodiment, a PUCCH is configured for a PSCell in the second SCG. The first configuration indication information is used to indicate performing the data transmission on the at least one cell in the first SCG by using the PUCCH configured for the PSCell in the second SCG.

In another optional embodiment, the layer 2 functional entity includes at least one of a Media Access Control entity, a Radio Link Control entity, or a Packet Data Convergence Protocol entity.

In another optional embodiment, the first configuration indication information is further used to indicate establishing, in the second SCG, at least one of a Packet Data Convergence Protocol entity or a Radio Link Control entity that corresponds to a bearer of the first SCG.

Correspondingly, the processing data transmission on at least one cell in a first SCG by using a layer 2 functional entity established in the second SCG of the user equipment includes processing data transmission on the bearer of the first SCG by using at least one of the Packet Data Convergence Protocol entity or the Radio Link Control entity that is established in the second SCG and that corresponds to the bearer.

In another optional embodiment, the first configuration indication information is further used to indicate establishing a split bearer of the first SCG and the second SCG and indicate a SCG, used to perform a split operation, in the first SCG and the second SCG.

In another optional embodiment, the user equipment 1700 further includes a transmitter configured to send a configuration complete message to the network device.

In another optional embodiment, all cell groups configured for the user equipment are associated with a same base station of the user equipment.

In another optional embodiment, the user equipment has multiple serving base stations, and the first SCG and the second SCG are associated with different base stations.

In another optional embodiment, the first configuration indication information is further used to indicate at least one type of the following configuration, in a data transmission process in the at least one cell in the first SCG, generating an encryption key by using a security configuration parameter of the second SCG of the user equipment, or in a data transmission process in the at least one cell in the first SCG, performing uplink timing adjustment by using a timing advance value of the second SCG of the user equipment.

The user equipment 1700 according to this embodiment of the present disclosure may correspond to the network device in the communication methods according to the embodiments of the present disclosure, and the foregoing and other operations and/or functions of the modules in the user equipment 1700 respectively implement corresponding procedures of the methods in FIG. 7 and FIG. 9 to FIG. 14. For brevity, details are not described herein again.

Therefore, according to the user equipment in this embodiment of the present disclosure, through configuration, uplink control information related to a cell in a first SCG of user equipment is transmitted by using a PUCCH of a first cell, where the first cell belongs to a second SCG of the user equipment, and/or data transmission on at least one cell in the first SCG is processed by using a layer 2 functional entity located in the second SCG, so that a quantity of parameters maintained by the user equipment can be reduced, thereby reducing complexity of the user equipment.

In addition, through configuration, the uplink control information related to the cell in the first SCG is transmitted by using the PUCCH of the first cell, avoiding an excessively high power requirement on the user equipment when transmission is performed on a large quantity of physical uplink channels simultaneously, and further improving feasibility of a system.

Figure 22:
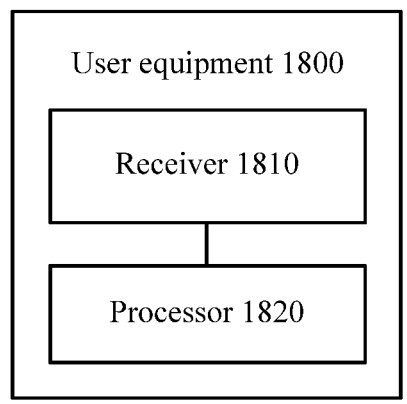
FIG. 22 is a schematic block diagram of user equipment according to another embodiment of the present disclosure.

FIG. 22 shows user equipment 1800 provided by another embodiment of the present disclosure. The user equipment 1800 includes a receiver 1810 configured to receive first configuration indication information sent by a network device, where the first configuration indication information is used to indicate at least one type of the following configuration, in a data transmission process in at least one cell in a first cell group of the user equipment, generating an encryption key by using a security configuration parameter of a second cell group of the user equipment, or in a data transmission process in at least one cell in the first cell group, performing uplink timing adjustment by using a timing advance value of a second cell group of the user equipment, and a processor 1820 configured to configure the first cell group according to the first configuration indication information received by the receiver 1810.

Therefore, according to the network device in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

It should be understood that in this embodiment of the present disclosure, the processor 1820 may be a central processing unit (CPU), or the processor 1820 may be another general purpose processor, a digital signal processor (DSP), an application-specific integrated circuit (ASIC), a field-programmable gate array (FPGA), or another programmable logic device, discrete gate or transistor logic device, or discrete hardware component. The general purpose processor may be a microprocessor or the processor may be any conventional processor or the like.

The network device may further include a memory. The memory may include a read-only memory and a random access memory and provide an instruction and data to the processor 1820. A part of the memory may further include a non-volatile random access memory. For example, the memory may further store device type information.

The network device may further include a bus system. In addition to including a data bus, the bus system may further include a power bus, a control bus, a state signal bus, and the like. However, for clear description, all buses are marked as the bus system in the figure.

In an implementation process, steps of the foregoing methods may be accomplished by using an integrated logic circuit of hardware in the processor 1820 or an instruction in a form of software. The steps of the method that are disclosed in the embodiments of the present disclosure may be directly performed and completed by a hardware processor or performed and completed by a combination of hardware and software modules in the processor. The software module may be located in a mature storage medium in the art, such as a random access memory, a flash memory, a read-only memory, a programmable read-only memory, an electric erasable programmable memory, or a register. The storage medium is located in the memory, and the processor 1820 reads information in the memory and completes the steps in the foregoing methods in combination with hardware of the processor 1820. To avoid repetition, details are not described herein again.

Optionally, the first cell group and the second cell group are associated with a same serving base station of the user equipment.

In another optional embodiment, the second cell group is a MCG or a SCG.

In another optional embodiment, serving base stations of the user equipment include a MeNB and at least one SeNB. The second cell group is a SCG, and the first cell group and the second cell group are both associated with a SeNB of the user equipment.

In another optional embodiment, the security configuration parameter includes at least one of the following parameters a SCG counter, a SCG intermediate key, an index value of a SCG intermediate key, or a serial number of a SCG intermediate key.

In another optional embodiment, that the first configuration indication information is used to indicate, in a data transmission process in at least one cell in the first cell group, generating an encryption key by using a security configuration parameter of a second cell group of the user equipment includes the first configuration indication information is used to indicate processing data transmission on the at least one cell in the first cell group by using a Packet Data Convergence Protocol entity located in the second cell group.

In this case, the processor 1820 is further configured to, according to that the data transmission on the at least one cell in the first cell group is processed by using the Packet Data Convergence Protocol entity located in the second cell group, which is indicated in the first configuration indication information, determine to generate, in the data transmission process in the at least one cell in the first cell group, an encryption key by using a security configuration parameter of the second cell group of the user equipment.

In another optional embodiment, that the first configuration indication information is used to indicate, in a data transmission process in at least one cell in the first cell group, performing uplink timing adjustment by using a timing advance value of a second cell group of the user equipment includes the first configuration indication information is used to indicate that the first cell group of the user equipment and the second cell group of the user equipment belong to a same TAG, or the first configuration indication information is used to indicate that a PSCell in the first cell group of the user equipment and a PSCell or a PCell in the second cell group of the user equipment belong to a same TAG.

In this case, the processor 1820 is further configured to, according to that the first cell group and the second cell group belong to the same TAG or the PSCell in the first cell group and the PSCell or the PCell in the second cell group belong to the same TAG, which is indicated in the first configuration indication information, determine to perform, in the data transmission process in the at least one cell in the first cell group, uplink timing adjustment by using the timing advance value of the second cell group of the user equipment.

In another optional embodiment, the receiver 1810 is further configured to receive second configuration indication information sent by the network device, where the second configuration indication information is used to indicate a random access resource allocated by the network device to the second cell group.

Correspondingly, the processor is further configured to perform a random access process in the second cell group according to the second configuration indication information received by the receiver 1810, to obtain a timing advance value of the second cell group.

In this case, the user equipment further includes a transceiver configured to communicate with the serving base station of the user equipment in the first cell group according to the timing advance value of the second cell group that is obtained by the random access unit.

In another optional embodiment, the user equipment 1800 further includes a transmitter configured to send a configuration complete message to the network device.

The user equipment 1800 according to this embodiment of the present disclosure may correspond to the user equipment in the communication methods according to the embodiments of the present disclosure, and the foregoing and other operations and/or functions of the modules in the user equipment 1800 respectively implement corresponding procedures of the methods in FIG. 8 to FIG. 14. For brevity, details are not described herein again.

Therefore, according to the network device in this embodiment of the present disclosure, through configuration, in a data transmission process in at least one cell in a first cell group of user equipment, an encryption key is generated by using a security configuration parameter of a second cell group of the user equipment, and/or in a data transmission process in at least one cell in the first cell group, uplink timing adjustment is performed by using a timing advance value of the second cell group, so that the user equipment does not need to maintain a large quantity of security configuration parameters or timing advance values, thereby reducing complexity of the user equipment, and improving feasibility of a system.

In addition, through configuration, in the data transmission process in the at least one cell in the first cell group, uplink timing adjustment is performed by using the timing advance value of the second cell group of the user equipment, so that the user equipment can directly communicate with a network side without performing a random access process in the first cell group, thereby reducing system resources and reducing power consumption of the user equipment.

An embodiment of the present disclosure further provides a communications system. The communications system includes user equipment and at least one serving base station of the user equipment, where multiple cell groups are configured for the user equipment, and a first serving base station in the at least one serving base station of the user equipment is associated with at least two cell groups of the multiple cell groups.

Optionally, the multiple cell groups include a first SCG and a second cell group. The second cell group is a MCG or a SCG, and the first SCG and the second cell group meet at least one type of the following configuration transmitting uplink control information related to a cell in the first SCG by using a PUCCH of a first cell, where the first cell belongs to a second cell group of the user equipment, processing data transmission on at least one cell in the first SCG by using a layer 2 functional entity located in the second cell group, processing data transmission on at least one cell in the first SCG by using a security configuration parameter of the second cell group of the user equipment, or processing data transmission on at least one cell in the first SCG by using a timing advance value of the second cell group of the user equipment.

A quantity of the at least one serving base station may be one. In this case, the UE may establish a connection only to one base station. The base station may configure one MCG and optionally, one or more SCGs for the UE.

A quantity of the at least one serving base station may also be multiple. For example, the at least one serving base station includes one MeNB and one SeNB. In this case, the MeNB is connected to the SeNB by using an X2 interface, and the UE may establish connections to the MeNB and the SeNB and then, may configure one MCG and one or more SCGs for the UE by using the MeNB and the SeNB. For another example, the at least one serving base station may include one MeNB and multiple SeNBs. The MeNB is connected to the SeNB by using an X2 interface, and the SeNBs are connected to each other by using an X2 interface. In this case, the UE may establish a connection to the MeNB and connections to the multiple SeNBs, and then, may configure one MCG and one or more SCGs for the UE by using the MeNB and the multiple SeNBs.

The second cell group is a MCG or a SCG. In an optional embodiment, the at least two SCGs include the second cell group.

In another optional embodiment, the first SCG and the second cell group are associated with a same serving base station of the user equipment.

In another optional embodiment, a quantity of the at least one serving base station of the user equipment is one, and multiple cell groups of the user equipment are all associated with the serving base station of the user equipment.

In another optional embodiment, the at least one serving base station of the user equipment includes a MeNB and at least one SeNB. The MeNB is associated with the MCG, and each of the at least one SeNB is associated with one or more SCGs in the at least two SCGs.

For example, N cell groups may be configured for the user equipment. The N cell groups include a MCG and (N-1) SCGs. N is an integer greater than 2. If the user equipment has only one serving base station, the N cell groups may be all associated with the serving base station of the user equipment. If the user equipment has one MeNB and at least one SeNB, the MeNB may be associated with a MCG and zero or at least one SCG in the N cell groups. Each SeNB may be associated with zero or at least one SCG in the (N-1) SCGs. This embodiment of the present disclosure is not limited thereto.

In an embodiment, the at least one serving base station may include the network device 1100 shown in FIG. 15, and the user equipment may be the user equipment 1300 shown in FIG. 17. Alternatively, the at least one serving base station may include the network device 1200 shown in FIG. 16, and the user equipment may be the user equipment 1400 shown in FIG. 18.

In another optional embodiment, the at least one serving base station may include the network device 1500 shown in FIG. 19, and the user equipment may be the user equipment 1700 shown in FIG. 21. Alternatively, the at least one serving base station may include the network device 1600 shown in FIG. 20, and the user equipment may be the user equipment 1800 shown in FIG. 22.

It should be understood that, the term "and/or" in this embodiment of the present disclosure describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method implemented by a user equipment, comprising:
receiving first configuration indication information from a network device, wherein the user equipment has at least two serving base stations comprising a master base station and a first secondary base station, and wherein the first configuration indication information indicates to generate an encryption key with a security configuration parameter of a second secondary cell group associated with the user equipment;
performing a data transmission process with a cell in a first secondary cell group; and
configuring the first secondary cell group according to the first configuration indication information,
wherein the network device is the first secondary base station associated with both the first secondary cell group and the second secondary cell group.

2. The communication method of claim 1, wherein the security configuration parameter comprises a secondary cell group counter.

3. The communication method of claim 1, further comprising processing the data transmission process on the cell using a packet data convergence protocol (PDCP) entity located in the secondary second cell group.

4. The communication method of claim 1, further comprising:
receiving second configuration indication information from the network device, wherein the second configuration indication information indicates a random access resource from the network device to the second secondary cell group of the user equipment;
performing a random access process in the second secondary cell group according to the second configuration indication information to obtain a timing advance value of the second secondary cell group; and
communicating with a serving base station associated with the user equipment in the first secondary cell group according to the timing advance value of the second secondary cell group.

5. The communication method of claim 1, wherein the security configuration parameter comprises a secondary cell group intermediate key or an index value of the secondary cell group intermediate key.

6. The communication method of claim 1, wherein the security configuration parameter comprises a secondary cell group intermediate key or a serial number of the secondary cell group intermediate key.

7. A device, comprising:
a processor; and
a memory coupled to the processor and storing instructions that, when executed by the processor, cause the device to be configured to:
allocate a first secondary cell group to a user equipment, wherein the user equipment has at least two serving base stations comprising a master base station and a first secondary base station; and
send first configuration indication information to the user equipment, wherein the first configuration indication information indicates instructions to generate an encryption key with a security configuration parameter of a second secondary cell group associated with the user equipment in a data transmission process with a cell in the first secondary cell group, and
wherein the device is the first secondary base station associated with both the first secondary cell group and the second secondary cell group.

8. The device of claim 7, wherein the first secondary cell group and the second secondary cell group are associated with a same serving base station of the user equipment.

9. The device of claim 7, wherein the security configuration parameter comprises at least one of a secondary cell group counter.

10. The device of claim 7, wherein the instructions further cause the device to be configured to process the data transmission process on the cell using a packet data convergence protocol (PDCP) entity located in the second cell group.

11. The device of claim 7, wherein the instructions further cause the device to be configured to:
receive second configuration indication information from the master base station and allocate the first secondary cell group to the user equipment before sending the first configuration indication information to the user equipment; and
determine, according to the second configuration indication information, to allocate the first secondary cell group to the user equipment.

12. The device of claim 7, wherein the security configuration parameter comprises a secondary cell group intermediate key or an index value of the secondary cell group intermediate key.

13. The device of claim 7, wherein the security configuration parameter comprises a secondary cell group intermediate key or a serial number of the secondary cell group intermediate key.

14. A device, comprising:
a processor; and
a memory coupled to the processor and storing instructions that, when executed by the processor, cause the device to be configured to:
receive first configuration indication information from a network device, wherein the user equipment has at least two serving base stations comprising a master base station and a first secondary base station, and wherein the first configuration indication information instructs to generate an encryption key with a security configuration parameter of a second secondary cell group associated with the device;
perform a data transmission process with a cell in a first secondary cell group; and
configure the first secondary cell group according to the first configuration indication information,
wherein the device is the first secondary base station associated with both the first secondary cell group and the second secondary cell group.

15. The device of claim 14, wherein the first secondary cell group and the second secondary cell group are associated with a same serving base station for the device.

16. The device of claim 14, wherein the security configuration parameter comprises a secondary cell group counter.

17. The device of claim 14, wherein the instructions further cause the device to be configured to process the data transmission process on the cell using a packet data convergence protocol (PDCP) entity located in the second secondary cell group.

18. The device of claim 14, wherein the instructions further cause the device to be configured to:
receive second configuration indication information from the network device, wherein the second configuration indication information indicates a random access resource from the network device to the second secondary cell group of the device;

perform a random access process in the second secondary cell group according to the second configuration indication information received, to obtain the timing advance value of the second secondary cell group; and communicate with a serving base station associated with the device in the first secondary cell group according to the timing advance value of the second secondary cell group.

19. The device of claim 14, wherein the security configuration parameter comprises a secondary cell group intermediate key or an index value of the secondary cell group intermediate key.

20. The device of claim 14, wherein the security configuration parameter comprises a secondary cell group intermediate key or a serial number of the secondary cell group intermediate key.

* * * * *

UNITED STATES PATENT AND TRADEMARK OFFICE
CERTIFICATE OF CORRECTION

PATENT NO. : 11,490,367 B2
APPLICATION NO. : 16/668989
DATED : November 1, 2022
INVENTOR(S) : Junren Chang It is certified that error appears in the above-identified patent and that said Letters Patent is hereby corrected as shown below:

On the Title Page

Page 2, item (56) References Cited, Other Publications: "3GPP TS 36.331, V 12.4.0, Dec. 2014, pp. 1410" should read "3GPP TS 36.331, V 12.4.0, Dec. 2014, pp. 1-410"

In the Claims

Claim 9, Column 60, Line 8: "comprises at least one of a secondary" should read "comprises a secondary"

Signed and Sealed this
Twentieth Day of December, 2022

Katherine Kelly Vidal
*Director of the United States Patent and Trademark Office*